(12) United States Patent
Szczepanek et al.

(10) Patent No.: US 6,690,668 B1
(45) Date of Patent: Feb. 10, 2004

(54) MODULAR INTERCONNECTION OF NETWORK SWITCHES

(75) Inventors: Andre Szczepanek, Hartwell (GB); Denis R. Beaudoin, Rowlett, TX (US); Iain Robertson, Cople (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,287

(22) Filed: Sep. 30, 1999

Related U.S. Application Data

(60) Provisional application No. 60/104,837, filed on Oct. 19, 1998.

(51) Int. Cl.$^7$ ............................................. H04L 12/56
(52) U.S. Cl. ...................................... 370/392; 370/403
(58) Field of Search ................................ 370/400, 401, 370/403, 405, 406, 434, 392, 258, 389, 395.53; 709/232

(56) References Cited

U.S. PATENT DOCUMENTS

| | | | | |
|---|---|---|---|---|
| 5,535,213 A | * | 7/1996 | Pan et al. ..................... | 370/258 |
| 5,790,541 A | * | 8/1998 | Patrick et al. ............... | 370/392 |
| 5,864,677 A | * | 1/1999 | Van Loo ....................... | 709/232 |
| 6,154,462 A | * | 11/2000 | Coden ......................... | 370/403 |

* cited by examiner

*Primary Examiner*—Seema S. Rao
*Assistant Examiner*—Melanie Jagannathan
(74) *Attorney, Agent, or Firm*—April M. Mosby; Wade James Brady III; Frederick J. Telecky, Jr.

(57) ABSTRACT

Network switching systems (10, 110, 210, 310, 410) for use in an Ethernet network are disclosed. Each of the switching systems includes switch devices (20) supporting multiple (e.g., eight) local ports, and one gigabit high-speed port; each of the high-speed ports are full-duplex ports. Each switching system also includes a gigabit switch device (30) having two full-duplex gigabit ports. According to one aspect of the invention, the switches (20, 30) are connected in a ring using their respective gigabit ports, with each of the switches (20, 30) having a Ring ID value. Upon receipt of a message packet at one of its local ports, the switches (20) attach a pretag with the Ring ID value upon the packet, and begin forwarding the packet around the ring until the destination address is registered with one of the switches (20, 30), or until the packet returns to the original switch (20) which, upon detecting its own Ring ID value, filters or discards the packet. According to another aspect of the invention, switches (20) have their gigabit ports connected to a crossbar-matrix switch (100); pretags added by the switches to their received packets indicate the crossbar ports to which the packets are addressed. According to another aspect of the invention, each of the switches (20, 30) applies flow control over the gigabit ports in response to a message occupying more buffer space than remaining buffers; this permits buffer space to be utilized when traffic permits, without allowing a small minority of channels to adversely affect others.

4 Claims, 13 Drawing Sheets

MODULAR INTERCONNECTION OF NETWORK SWITCHES

CROSS-REFERENCE TO RELATED APPLICATIONS

This application claims the benefit, under 35 U.S.C. §119(e)(1), of U.S. Provisional Application No. 60/104,837, filed Oct. 19, 1998, which is incorporated herein by this reference.

STATEMENT REGARDING FEDERALLY SPONSORED RESEARCH OR DEVELOPMENT

Not applicable.

BACKGROUND OF THE INVENTION

This invention is in the field of data communications networks, and is more specifically directed to switch architectures for packet-based communications, such as Ethernet.

In recent years, the deployment of local-area networks (LANs) of personal computers and workstations in business and educational enterprises has become widespread. These modem networks have provided significant productivity gains, not only by providing individuals with the ability to electronically communicate with one another, but also by enabling shared access of data bases and documents stored on a central server and on the networked client workstations. With the ever-improving performance of modem communications and network elements, both large and small enterprises now utilize networks among their personal computers and workstations. Conventional LANs can also be interconnected with one another by way of bridges or routers into a Wide Area Network (WAN). Typically, each network segment includes a number of client workstations and a bridge or router; interconnect ion of the bridges and routers in a ring or tree fashion permits communication between clients located on different segments of the WAN. Further, the availability of Internet access to such networked computers extends desktop access beyond local, proprietary, data sources to worldwide public and secure data source sites.

The rapid improvement in functionality and performance of modern personal computers and workstations has, in turn, created a desire for higher data rate network communications, as the quantity of data that can be processed by a client workstation has increased accordingly. Similarly, high bandwidth communications can enable the exchange of data types such as 3-D images, full-motion video, sound files, and the like, each of which are represented by large blocks of data. Another trend is from half-duplex communications over the network to full duplex network communications, permitting the simultaneous transmission and receipt of data, and thus effectively doubling the bandwidth while eliminating bandwidth loss due to collisions.

Packet-based data communications is a common approach to data communications in LANs and WANs, particularly in high data rate connections over busy networks. As opposed to connection-oriented networks, in which a dedicated connection is established between the source and destination nodes in the network, packet switching divides each message (i.e., data block to be communicated) into small packets. Each packet carries identifiers of the source and destination nodes of its corresponding message, along with an identifier of its location in the sequence of packets that comprise the overall message. This permits the multiplexed communication of packets from multiple messages, between various source and destination nodes, over the network. The identifiers in each packet allows the destination nodes to retain those packets addressed thereto, and to resequence the received packets into the communicated message. As a result, packet-switched networks permit more nodes to communicate with one another at a given time, with each communication utilizing a portion of the overall network bandwidth without blocking other channels. Examples of conventional packet-based networks include Ethernet, token ring, and FDDI.

Traditionally, many Ethernet LANs have been constructed so as to use repeaters, or hubs, to which each client workstation connects; the hubs provide flexibility in the addition and deletion of clients from the network, and also enables the use of twisted-pair wire for network communications. Most existing hubs and repeaters provide only half-duplex communications, however, and as such some amount of conflict among clients on the same network "segment" (i.e., associated with the same hub) may arise.

Recently, LAN switches have become available for use in Ethernet networks, as well as in FDDI and token ring LANs. A LAN switch has multiple ports, each of which may connect to a client workstation (or a network hub, as the case may be), or provide an uplink to another switch or a server. A LAN switch differs from a bridge or hub, in that the switch allows simultaneous switching of packets between multiple pairs of its ports. As a result, the switch provides higher bandwidth for its clients, in the aggregate, with reduced latency. In addition, ports of an Ethernet switch can be connected both to a network segment via a hub, and to a client workstation over a dedicated segment.

FIG. 1 illustrates a conventional switched Ethernet network of client workstations $C_0$ through $C_7$ with server SVR. In this example, client workstations $C_0$ through $C_3$ comprise a network segment attached to half-duplex hub H. As such, only one of client workstations $C_0$ through $C_3$ can be transmitting or receiving at any given time. Hub H is connected to one port of Ethernet switch SW. Client workstations C4 through C6 are connected to other ports of switch SW, by way of dedicated full-duplex connections. Switch SW is also connected to server SVR by way of a full-duplex connection. The use of full-duplex-capable switch SW permits client workstations C4 through $C_6$ to communicate with one another, with server SVR, or with one of client locations $C_0$ through $C_3$ via hub H, in multiple pairs, thus improving the overall bandwidth of the network. As such, Ethernet switches such as switch SW in FIG. 1 are becoming popular in high-traffic network applications.

Heretofore, however, the number of ports supportable by conventional switches have been relatively limited. For example, conventional Ethernet switches can support on the order of twenty-four full-duplex 10-Mbit/sec ports and three full-duplex 100-Mbit/sec ports. With the advent of gigabit Ethernet communications, conventional Ethernet switches for supporting eight full-duplex 100-Mbit/sec ports and one 1000-Mbit/sec ("gigabit") port are now entering the marketplace.

However, network designers and users are desirous of supporting large numbers of ports, particularly if dedicated full-duplex connections of client workstations (e.g., client workstations $C_4$ through $C_6$ of FIG. 1) are desired. Because of the limitation of the number of ports supported by conventional switch architectures, these conventional designs must insert additional levels of hierarchy into the switching architecture to provide the desired number of ports for a given network. Not only does the management of the network become complex in such conventional arrangements, but the reconfiguration of ports in the network is made quite cumbersome.

Additionally, conventional switch architectures do not provide for the ability of switches to be modularly combined with one another into a more complex switch system, without involving the additional levels of hierarchy noted above. As such, the capacity limitations provided by conventional switches are limited to that provided by switch devices arranged on a single circuit board, or within a single switch enclosure. The interconnection of multiple ones of these circuit boards or enclosures into a unitary switch system is therefore not readily achievable according to conventional techniques.

BRIEF SUMMARY OF THE INVENTION

It is therefore an object of the present invention to provide a network switch system that can be flexibly realized as a combination of network switch modules, in order to support a high port density from a single switch location.

It is a further object of the present invention to provide such a network switch system which includes high-speed uplink capability.

It is a further object of the present invention to provide such a network switch system in which additional ports and modules may be easily added.

It is a further object of the present invention to provide such a network switch system in which new communications from a port is readily established.

Other objects and advantages of the present invention will be apparent to those of ordinary skill in the art having reference to the following specification together with its drawings.

The present invention may be implemented by way of a configurable plurality of ring arrangements of network switch devices. Each ring is preferably implemented on a unitary circuit board, possibly within its own enclosure. The switches in each ring are capable of "learning" address information for packet communications. Communications among ports on the switch devices in the ring may then be handled by each switch determining whether the packet was sourced by itself (in which case the packet is discarded), and if not, for determining whether the destination address is at one of its ports (in which case the packet is retained) or mapped to a downstream switch on the ring (in which case the packet is forwarded). The multiple rings of switch devices may be interconnected by way of a ring between switches in each ring. The learning of address information thus occurs not only within each ring, but across rings over the entire switch system.

DETAILED DESCRIPTION OF THE INVENTION

As will become apparent from the following description, the present invention may be utilized in connection with a wide variety of implementations, and in connection with packet-switched networks of various protocols and communications types. The following description, which is directed to several embodiments of the present invention in connection with Ethernet networks, is therefore presented by way of example only, it being understood that those skilled in the art having reference to this specification will be readily able to utilize and realize the present invention in connection with alternative implementations, for Ethernet and networks of other types, without departing from the scope of the present invention as hereinafter claimed.

Figure 1:
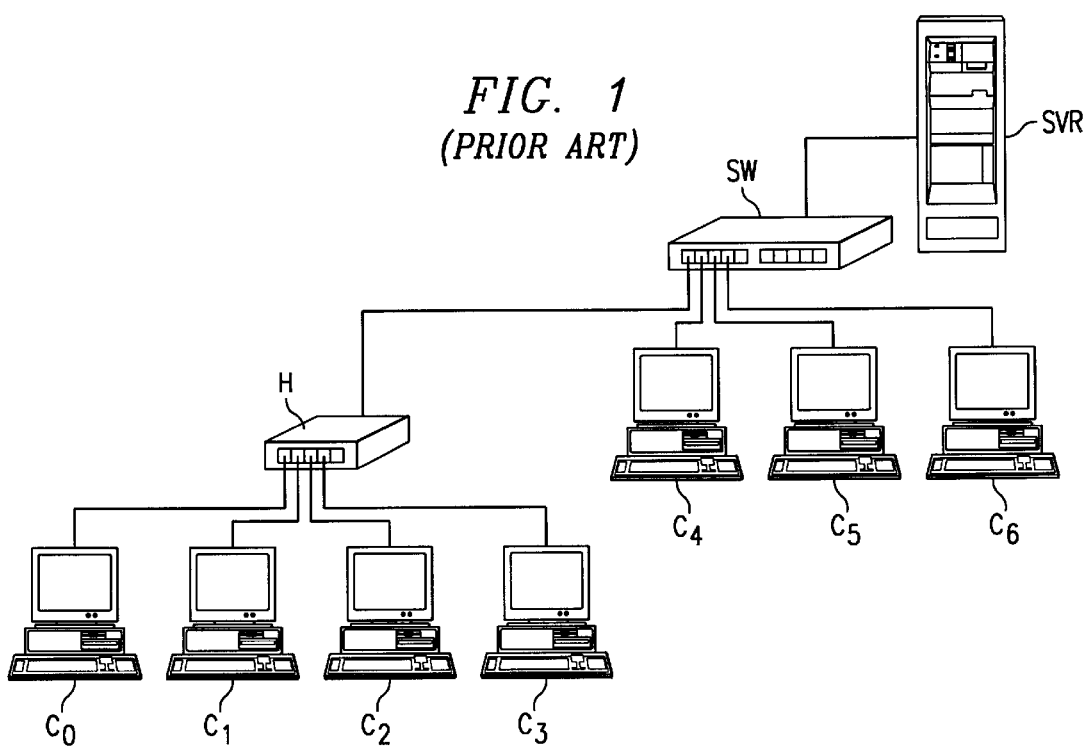
FIG. 1 is an electrical diagram, in block form, of a conventional switched Ethernet network.
Figure 2:
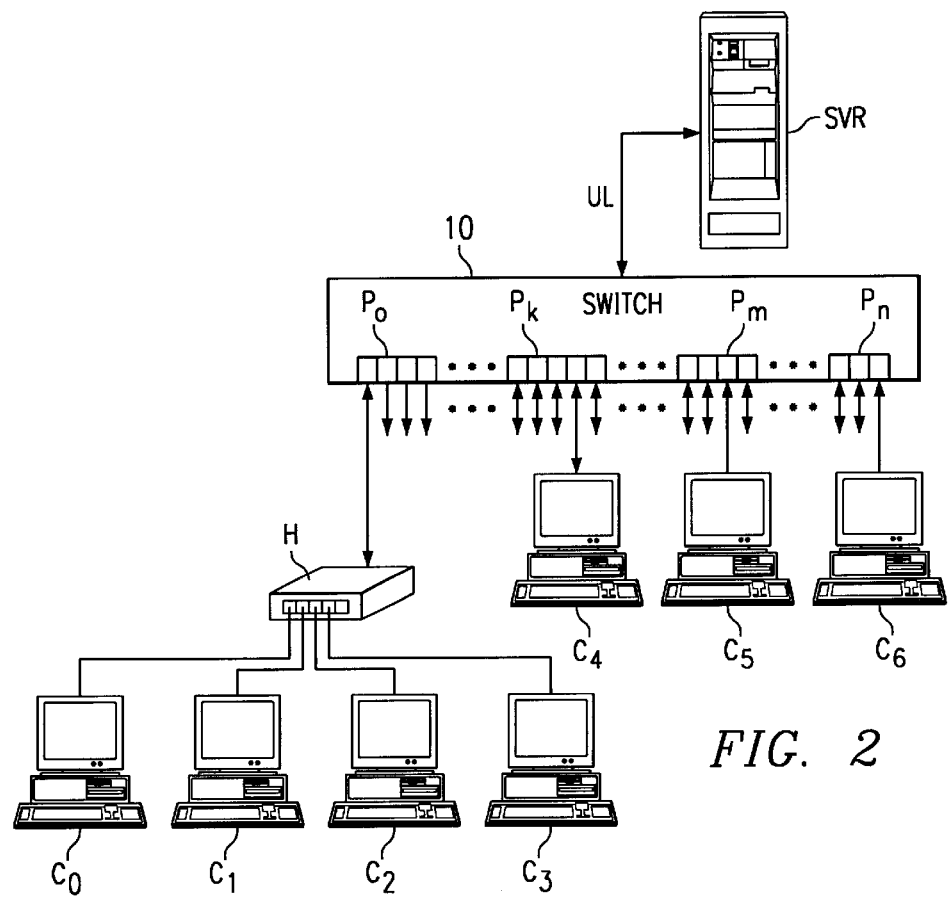
FIG. 2 is an electrical diagram, in block form, of a switched Ethernet network according to the preferred embodiments of the invention.

FIG. 2 is a high-level block diagram of an Ethernet network into which the preferred embodiments of the present invention may be readily implemented. As in the case of the conventional switched network discussed above relative to FIG. 1, client workstations client workstations $C_0$ through $C_3$ are connected in a network segment via hub H. Hub H, as well as client workstations $C_4$ through $C_6$, are connected to corresponding ports of switch system 10. In the example of FIG. 1, hub H is connected to switch system 10 via port $P_0$, and client workstations $C_4$, $C_5$, $C_6$ are connected to switch system 10 via ports $P_k$, $P_m$, $P_n$, respectively. Each of ports P, in this exemplary implementation, are 100-Mbit/sec, full-duplex, connections. Switch system 10 is also connected to server SVR by way of uplink UL, which operates as a high performance (e.g., 1000-Mbit/sec, or "gigabit") full-duplex connection.

Switch system 10, according to the preferred embodiments of the present invention, is capable of handling a high number of ports P; additionally, as indicated in FIG. 2, switch system 10 may also support one (or more) high-speed uplinks UL. For example, it is contemplated that, according to current technology, switch system 10 according to the present invention may support on the order of twenty-four to thirty-two ports P, each of which may be 100-Mbit/sec connections. Additionally, it is contemplated that other connections, in number and in type, may also be supported by switch system 10, as will become apparent from the following description.

Figure 3:
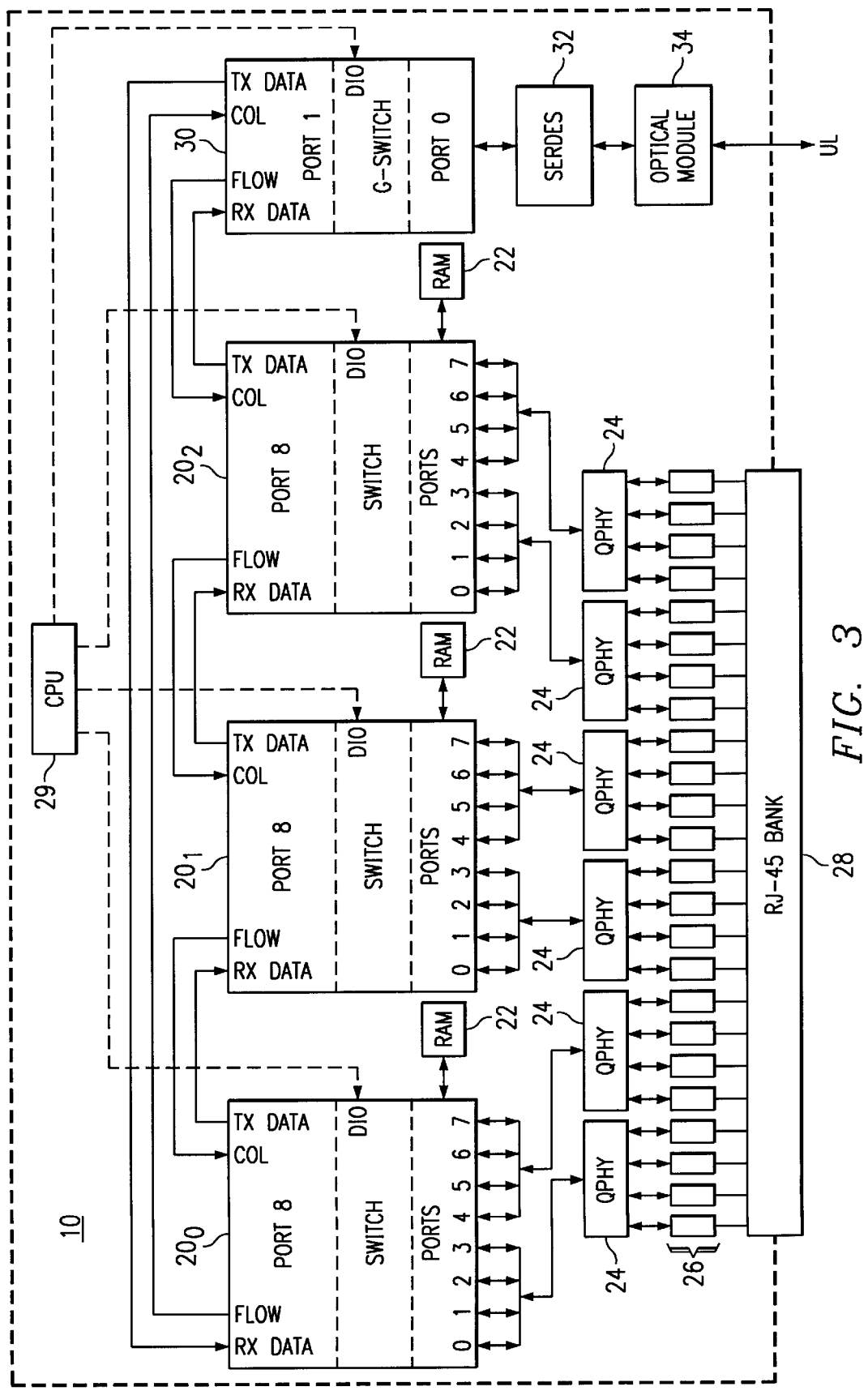
FIG. 3 is an electrical diagram, in block form, of a switch system in the network of FIG. 2 according to a first preferred embodiment of the invention.

Referring now to FIG. 3, the arrangement of switch system 10 according to a first preferred embodiment of the invention will now be described in detail. Switch system 10, in this embodiment of the invention, provides an Ethernet switch with 0/24/1 capability (i.e., zero 10-Mbit/sec ports, twenty-four 100-Mbit/sec ports, and one 1000-Mbit/sec port), by way of a relatively simple system architecture.

As shown in FIG. 3, switch system 10 includes three Ethernet switch devices 20, and one gigabit Ethernet switch device 30, connected in a ring fashion. According to this embodiment of the invention, each of switch devices 20 are individual integrated circuits providing 0/8/1 Ethernet switch capability, while switch device 30 is a single integrated circuit providing 0/0/2 Ethernet switch capability. Each switch 20 is connected to, and operates in conjunction with, external random access memory (RAM) 22, as shown in FIG. 3, preferably organized and connected to switch 20 by way of the well-known Rambus architecture. The ring interconnection of switches 20, 30 with one another will be described in further detail hereinbelow.

Each switch 20 has eight 100-Mbit/sec ports, numbered ports 0 to 7 for each device, connected in groups of four to quad physical layer interface devices 24. An example of a suitable physical layer interface device 24 is the BCM5208, available from Broadcom. Each physical layer interface device 24 is, in turn, connected to four magnetic transformers 26 for driving and receiving signals from corresponding RJ-45 jacks in RJ45 bank 28. Examples of magnetic transformers include the S558-5999-47 quad transformers (i.e., four transformers per unit) available from Bel Fuse, and equivalents thereto. RJ-45 jacks in bank 28 are of conventional construction, for providing Ethernet connection by way of twisted pair wire. As such, the RJ45 jacks of bank 28 correspond to ports $P_0$ through $P_n$ of FIG. 2, to which hubs H and client workstations C may be connected.

Each switch 20 also has a gigabit, 1000-Mbit/sec, port, numbered as port 8, which is capable of full-duplex communication. In the ring arrangement of this embodiment of the invention, the transmit side of port 8 of switch $20_0$ is connected to the receive side of port 8 of switch $20_1$, the transmit side of port 8 of switch $20_1$ is connected to the receive side of port 8 of switch $20_2$, and the transmit side of port 8 of switch $20_2$ is connected to the receive side of port 1 of gigabit Ethernet switch device 30. The transmit side of port 1 of switch 30 is connected to the receive side of port 8 of switch $20_0$, completing the ring.

In the implementation of switch system 10, and considering the high data rate communications carried out over the ring, it is preferred that switches 20, 30 be placed as physically close to one another as possible, thus avoiding long signal paths. Additionally, small series resistors (e.g., 33 Ω) are preferably placed near the transmitting terminals of the gigabit ports, to prevent signal ringing.

Gigabit Ethernet switch device 30 supports two 1000-Mbit/sec full-duplex ports, numbered as ports 0 and 1, each of which preferably include integrated physical coding sublayer logic to provide a direct, ten-bit, digital interface to gigabit transceivers. Port 0 of switch 30 is connected to serializer/deserializer 32, which converts parallel data from switch 30 into a serial datastream (and vice versa); serializer/deserializer 32 is connected to optical module 34, in this embodiment of the invention, which is a serial transceiver adapted for use with fiber optic cabling, which serves as uplink UL in this example.

Switch system 10 of this preferred embodiment of the invention also includes optional central processing unit (CPU) 29, which is programmed to provide management functions relative to switches 20, 30. CPU 29 may be coupled to each of switches 20, 30 by way of their respective digital input/output ports DIO. The management functions that may be controlled by CPU 20 include support for Simple Network Message Protocol (SNMP), Spanning Tree (bridge-protocol-data-unit, or BPDU, frames), and Virtual Local Area Network (VLAN) operation.

Figure 4A:
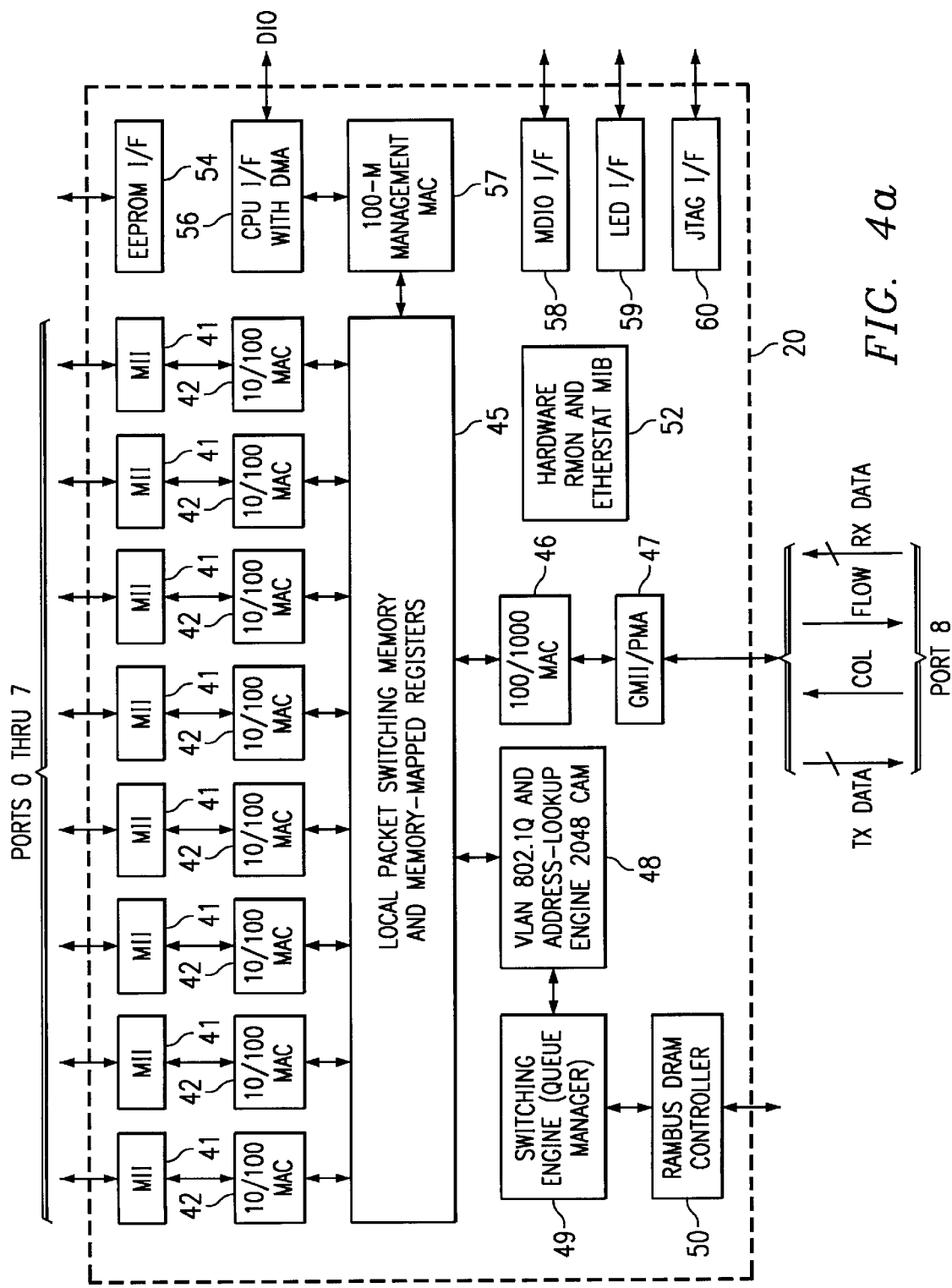
FIGS. 4a and 4b are electrical diagrams, in block form, of integrated circuit switch devices utilized in the switch system of FIG. 3 according to the first preferred embodiment of the invention.

Referring now to FIG. 4a, the architecture of one of switches 20 according to the preferred embodiments of the invention will be described in detail, it being understood that the others of switches 20 will be similarly constructed.

As shown in FIG. 4a, each of 100-Mbit/sec ports 0 through 7 communicate with (i.e., both drives and is driven by, in the bidirectional sense) an associated media independent interface (MII) 41, which in turn interfaces with 10-/100-Mbit/sec media access control (MAC) 42 associated with the port. Each MAC 42 is bidirectionally coupled with local packet switching memory 45, as shown in FIG. 4a. On the receive side for a given port, MII 41 and MAC 42 serve to interpret incoming data from the port, to detect and remove the preamble of the data, and extract such parameters of address, frame length, and other header information, as well as perform CRC checksum data handling. MAC 42 then assembles the data into the buffer provided by switching memory 45. On the transmission side, MAC 42 reads data from switching memory 45, and passes this data to the corresponding MII 41 and thus to the physical layer; CRC block checks are performed to ensure that the data are not corrupted. MII 41 then formats and transmits the data to be transmitted, in the manner appropriate for the particular medium connected to the port. Additionally, each MAC 42 preferably includes some amount of adaptive performance optimization logic, enabled on a port-by-port basis to improve the overall performance of switch system 10 by delaying frames to be transmitted from ports that have experienced numerous half-duplex collision events. Each of MACs 42, in combination with the associated MII 41, also preferably effects some amount of flow control, for example by way of responding to "backpressure" from the destination of its transmissions.

The gigabit port, port 8, of switch 20 is provided by way of GMII/PMA interface 47, in combination with 100/1000 MAC 46. According to this embodiment of the invention, three possible modes of operation are available to interface 47, including operation as a physical media attachment interface (PMA), media independent interface (MII) for 100-Mbit/sec communication, and gigabit MII (GMII) for 1000-Mbit/sec communication. Selection of the particular interface mode may be made by way of configuration signals applied to control terminals of this port. Similarly as noted above relative to FIG. 3, GMII/PMA interface 47 drives transmit data lines TX DATA and flow control line FLOW, and receives signals on receive data lines RX DATA and flow control line COL. Other control lines and terminals (not shown) are also provided by interface 47, for operation in the modes noted above. In addition to the transmission and receipt functionality noted above relative to MACs 42, MAC 46 also provides full-duplex hardware flow control, for example by way of IEEE standard 802.3 frame-based flow control. In the ring arrangement of FIG. 3 according to the preferred embodiment of the invention, flow control is communicated by way of the FLOW and COL terminals at interface 47, as will be described in further detail hereinbelow.

As noted above, local packet switching memory 45 serves as a buffer memory for each of the transmission channels being handled by ports 0 through 8 of switch 20. Additionally, high-speed external memory may be implemented (e.g., RAM 22 of FIG. 3), for example by way of a Rambus interface under the control of Rambus DRAM controller 50. In this manner, local packet switching memory 45 can operate as a buffer that is internal to switch 20, with data then transferred to and from RAM 22 in high-bandwidth bursts, thus reducing the likelihood of memory buffer bottlenecking.

As indicated in FIG. 4a, local packet switching memory 45 also includes a portion dedicated to memory-mapped registers that are addressable by various interfaces, as will be noted below, primarily for storing control and configuration information for switch 20. The states of these registers thus establish the parameters under which various control functions within switch 20 control the Ethernet switching operations executed thereby, as will now be described. Switching of packets is effected primarily by switching engine 49, in combination with address lookup engine 48. Switching engine 49 operates substantially as a queue manager, and prioritizes receive and transmit traffic according to a predetermined set of rules. For example, highest priority is preferably assigned to frames currently being transmitted to avoid underrun conditions; next priority is assigned that are received when the free-buffer stack is not empty, thus ensuring that received frames are not dropped unless receipt is impossible. Lower priority is assigned to frames queued for transmission, but for which transmission has not yet started, and lowest priority is assigned to network management frames. Switching engine 49 is also coupled to Rambus DRAM controller 50, for control of the transmission and receipt of packet data to RAM 22 (FIG. 3) as appropriate.

Address lookup engine 48 is logic for storing packet address associations relative to the ports supported by switch 20, and for performing source-address and destination-address comparisons with the stored associates. Additionally, address lookup engine 48 also forwards packets with unknown addresses to one or more specified ports, as will be described hereinbelow, responsive to configuration information stored by way of programmable masks. The operation of address lookup engine 48 in executing communications in the ring arrangement of FIG. 3 will be described in further detail hereinbelow.

Additionally, address lookup engine 48 may also include logic for supporting virtual LANs, such as specified by IEEE standard 802.1Q. In this case, each port may be programmed to be an access port or a non-access port, in which case address lookup engine 48 can recognize frames with VLAN tags, and transmit those frames to systems that similarly support the VLAN functionality.

Switch 20 further includes certain other functions useful in its management and control. EEPROM interface 54 provides communication capability with an external electrically erasable programmable read-only memory (EEPROM) in which configuration information may be programmed and stored. On reset or power-up, switch 20 accesses the configuration information contained in the external EEPROM via interface 54, and loads this configuration information into memory-mapped registers in its local memory 45. CPU interface 56 is connected to port DIO, to transmit and receive configuration and management information, for example by way of direct memory access (DMA), between the memory-mapped registers in local memory 45 of switch 20 and CPU 29 (FIG. 3) if present in switch system 10. This management information, preferably in the form of packets similar to the communications handled by switch 20, is applied to and read from local packet switching memory 45 via management MAC 57. Other miscellaneous functions included in switch 20 according to this preferred embodiment of the invention include management interface 58 which provides a serial interface for MII management data, LED interface 59 from which signals may be applied to LED indicators of switch system 20 for viewing by the operator, and JTAG interface 60 for the receipt and transmission of serial test signals in the conventional manner. Additionally, switch 20 includes hardware remote monitoring (RMON) and Etherstat management information bases (MIBs) 52 for storing per-port operational parameters that may be externally monitored.

Figure 4B:
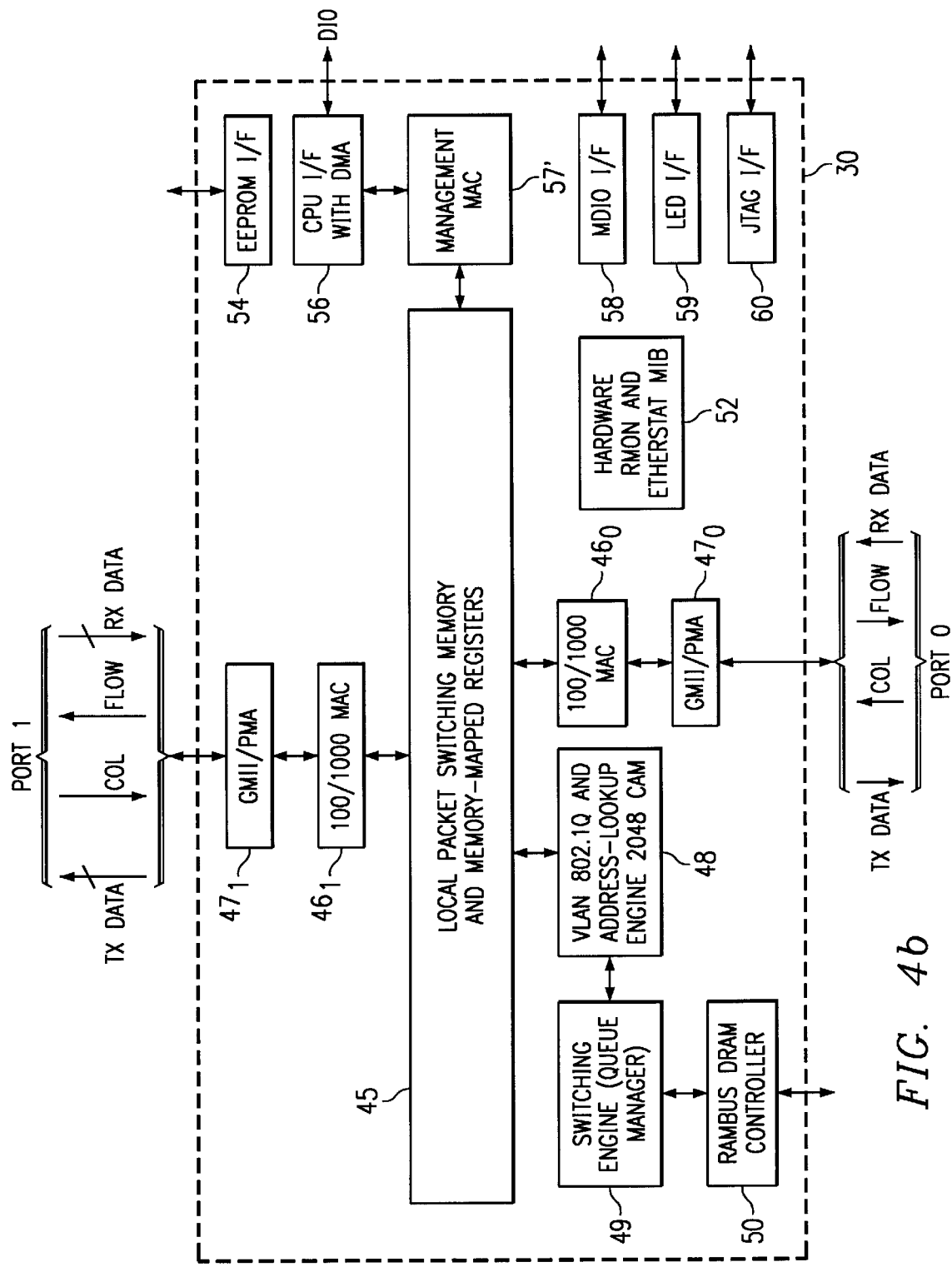

According to the preferred embodiments of the present invention, gigabit switch 30 is similarly constructed as switch 20, as will now be described relative to FIG. 4b, in which common reference numerals refer to common features in switches 20 and 30. As shown in FIG. 4b, switch 30 supports two gigabit ports, numbered as ports 0 and 1, by way of the combination of 100/1000 MAC 46 and GMII/PMA interface 47. As in the case of the gigabit port of switch 20, GMII/PMA interface 47 can operate in any one of three selectable modes of operation, namely as a physical media attachment interface (PMA), as a media independent interface (MII) for 100-Mbit/sec communication, and as a gigabit MII (GMII) for 1000-Mbit/sec communication. GMII/PMA interface $47_0$ drives transmit data lines TX DATA and flow control line FLOW, and receives signals on receive data lines RX DATA and flow control line COL, for gigabit port 0, and GMII/PMA interface $47_1$ drives transmit data lines TX DATA and flow control line FLOW, and receives signals on receive data lines RX DATA and flow control line COL, for gigabit port 1. For each port, other control lines and terminals (not shown) are also provided to interface 47, for operation in the modes noted above. Also as noted above, MAC 46 provides full-duplex hardware flow control by way of IEEE standard 802.3 frame-based flow control. However, similarly as in the case of switch 20 described above, in the ring arrangement of FIG. 3 according to the preferred embodiment of the invention, flow control is communicated by way of the control lines FLOW and COL at interface 47, as will now be described in further detail.

As known in the art, flow control in Ethernet networks, as well as other communications networks, operates according to the concept of "backpressure". In order to reduce the risk of discarded incoming message frames, Ethernet network elements such as switches 20, 30 provide some amount of buffering to their receive sides; as noted above relative to FIGS. 4a and 4b, switches 20, 30 include such packet buffering by way of local packet switching memory 45 as well as external RAM 22. Backpressure refers to a receiving network element indicating, to a transmitting network element, that insufficient resources (e.g., buffer capacity) are available at the receiving end for processing the current message. The transmitting network element can then respond to the backpressure signal to stop sending additional packets over the channel, until the already-buffered packets have been processed and cleared from the packet buffer, freeing additional space for new packets. According to the preferred embodiments of the invention, switches 20, 30 effect backpressure by asserting an active state on control line FLOW at the receive side of the associated ports; this signal is received at the transmit port of another network element, such as another switch 20, 30, at its control input COL. In half-duplex communications, an active state on control line FLOW (received on control line COL) indicates a collision event, in response to which transmission will be stopped; in full-duplex communication, this active state on control line FLOW will, in flow-capable elements, cause the transmitting element to produce pause frames.

According to the preferred embodiments of the present invention, switches 20, 30 include an efficient technique for determining when backpressure ought to be applied, particularly in the case of "head-of-line blocking". The situation of head-of-line blocking occurs when incoming network traffic, from multiple sources, aggregate at a single receiving port to such an extent as to overwhelm the bandwidth of that receiving port. For the case of switches 20, 30, such a situation can be handled by the buffer capability for short bursts; however, sustained overloading of a receiving port can exhaust even a generously-sized buffer. According to conventional buffering approaches, when frame backlog increases to such an extent as to consume the available resources, neighboring transmission unrelated channels are also affected, degrading overall network performance. For example, conventional switches utilize a flow threshold value, which is a control register value corresponding to the number of buffers remaining in the buffer at which, when reached, backpressure is to be applied to received communications channels. According to this conventional approach, if incoming traffic is being buffered to such an extent that the available buffer count reaches the flow threshold, whether due to one particularly dominant channel or due to all channels slightly overloading the switch bandwidth, the switch applies backpressure to all ports, regardless of which port or ports is causing the overload. Once the buffered packets are processed to the extent that the free buffer count again exceeds the flow threshold value, the backpressure is removed, permitting transmission of new packets from the source network elements. While the flow threshold value may be selected to optimize the completion of a maximum-size frame for each of the ports, in effect providing enough time to each port to activate flow control mechanisms without requiring a frame to be "dumped", this conventional method allows a small minority of ports to cause flow control backpressure on channels that are not responsible for the overload, adversely affecting overall network communication.

According to the preferred embodiments of the invention, switches 20, 30 are configurable into a mode in which the resource usage threshold at which backpressure is to be applied to a transmitting channel varies with the available memory resources of the switch 20, 30. In this manner, a heavy traffic channel may be supported to a higher degree when the number of channels carrying traffic is low, but without unfairly occupying these same resources when switch 20, 30 is receiving many channels. The following description will be presented relative to switch 20, for the sake of clarity, it being understood that switch 30 is similarly constructed and operates in a similar manner.

Figure 5:
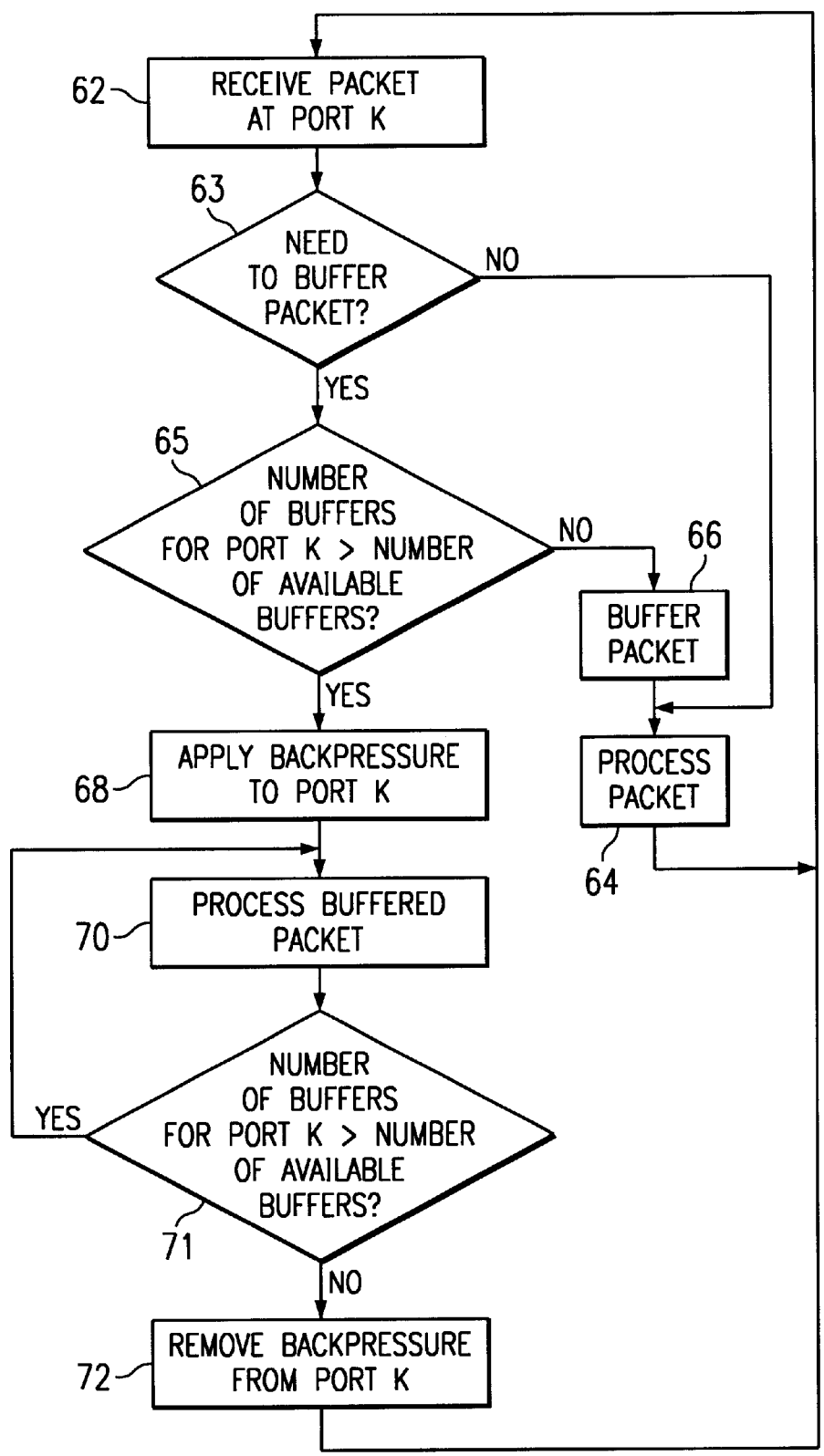
FIG. 5 is a flow diagram illustrating the operation of one of the switch devices of FIG. 4a in executing flow control according to the preferred embodiments of the invention.

Referring now to FIG. 5, the operation of switch 20 to apply head-of-line blocking flow control according to the preferred embodiments of the invention will now be described in detail. This operation will be described relative to a single port k, it being understood that similar processing and decision-making will be simultaneously carried out relative to the other ports supported by switch 20. Furthermore, it is contemplated that this operation of switch 20 will be carried out primarily by logic in switching engine 49 therein, although it is of course to be understood that such other logic provided within switch 20 for the management of the operation of the communication ports can equivalently perform the operations described below. As such, reference will be made hereinbelow simply to the switch itself performing the operations, it being understood that particular logic circuitry therewithin will typically be performing the operations.

In process 62, port k receives a message packet and, in decision 63, determines whether this received packet must be buffered (decision 63 is YES) or if the bandwidth of port k is sufficient at this point in time so that the packet may be processed without buffering. If the packet may be processed (decision 63 is NO), process 64 is performed by switch 20 to process the received packet, generally by forwarding the packet on to its destination port according to the registered destination address as found by address lookup engine 48. Control then passes back to process 62 for the receipt of the next packet.

If the received packet cannot be processed at this point (decision 63 is YES), switch 20 next performs decision 65 to determine whether the head-of-line blocking (HOLB) threshold has been exceeded for port k. The HOLB threshold according to this preferred embodiment of the invention varies according to the amount of available buffers in the packet buffer memory (which, in this embodiment of the invention, includes local packet switching memory 45 and external RAM 22). According to this exemplary implementation, the HOLB threshold for a particular port k is the number of available buffers remaining in the packet buffer memory of switch 20. As such, the HOLB threshold will vary according to the number of ports of switch 20 that are backlogged, and that therefore require buffering by packet buffer memory. Effectively, the HOLB threshold for a given port is equal to half of the available buffers at the time. In the steady-state, in the case where n ports are being buffered, each port will be provided with $1/n+1$ of the total packet buffer memory. For example, if only one port is being buffered, this port may occupy ½ of the total packet buffer memory before reaching the HOLB threshold; if six ports are being buffered, the HOLB threshold for each will be ⅐ of the packet buffer memory space. Accordingly, in decision 65, switch 20 determines whether, for the current port k, the HOLB threshold will be exceeded by the received packet, by determining whether the number of buffers associated with port k is greater than the number of buffers remaining available in the packet memory of switch 20. If sufficient resources remain in the packet buffer memory for port k (decision 65 is NO), switch 20 buffers the packet received at port k in process 66, processes the oldest buffered packet for port k in process 64, and awaits the next packet to be received from port k (process 62).

However, if the number of buffers occupied for packets received from port k has already reached the HOLB threshold (decision 65 is YES), switch 20 responds to the newly received packet by applying backpressure to port k. As noted above, this backpressure preferably takes the form of the receive side of port k asserting an active level on its output control line FLOW; in response to this backpressure signal (received at control line COL), the transmitting port will take the appropriate action according to its capability, which may include detection of a collision (such as in the half-duplex mode), or the generation of pause frames in flow-capable full-duplex transmitting ports.

Switch 20 then continues to attempt to clear the backlog by processing buffered packets associated with port k in process 70, while the backpressure is being applied to port k. Upon the processing of one or more buffered packets in process 70 (generally in a FIFO manner), switch 20 performs decision 71 to determine whether the number of buffers used by port k continues to exceed the number of then-available buffers in the packet buffer memory, following the processing of packets effected by process 70. It should be noted that the number of available buffers in the packet buffer memory, and thus the HOLB threshold in process 71, may differ from the HOLB threshold used by decision 65, depending upon the buffering being carried out by other ports of switch 20 in the meantime. If the HOLB threshold is still exceeded for port k (decision 71 is YES), control passes back to process 70 for the processing of additional packets for port k, with the backpressure still remaining. However, if the buffer resources associated with port k now falls below the HOLB threshold of the number of available buffers (decision 71 is NO), switch 20 may now remove the backpressure from port k to permit additional buffering of received packets in process 72; control then returns to process 62 for the receipt of additional packets at port k, which will now be transmitted by the source network element (backpressure now being removed).

Referring now to FIGS. 6*a* through 6*e*, an example of the operation of switch 20 in connection with the process of FIG. 5, for the case of two ports which require buffering in the packet buffer memory comprised of local packet switching memory 45 and RAM 22, as noted above. For simplicity of description, the example of FIGS. 6*a* through 6*e* will be described in connection with local packet switching memory 45 having a total of sixteen available buffers, it being understood that the packet buffer memory of an actual switch 20 will generally have many more than sixteen total buffers.

Figure 6A:
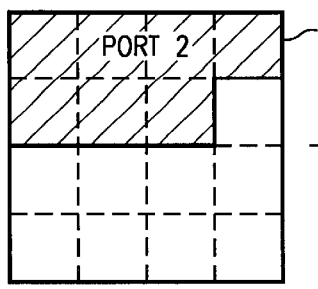
FIGS. 6a through 6e are memory diagrams illustrating an example of the flow control process of FIG. 5 according to the preferred embodiments of the invention.

FIG. 6*a* illustrates the state of the exemplary buffers of local packet switching memory 45, in the event where port 2 of switch 20 has message packets buffered in seven buffers of local packet switching memory 45. In this example of a sixteen buffer packet memory, and because at this point only one port (port 2) is buffering packets, the HOLB threshold is effectively eight buffers, which is one-half (1/n, where n=2) of the number of available buffers. Referring to FIG. 5, this instance of decision 65 for port 2 will determine that the buffered frames of port 2 occupy only seven buffers, with nine buffers remaining available, and that therefore the HOLB threshold has not yet been reached for port 2 (i.e., decision 65 is NO). In this case, backpressure will not be applied to port k, and the buffered packets will be processed by process 64 in the usual manner.

Figure 6B:
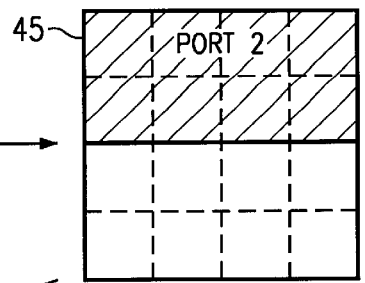

FIG. 6*b* illustrates the case where the number of buffers required for packets received from port 2 has reached the HOLB threshold of eight buffers in this example; this is due to port 2 occupying eight buffers, with eight available buffers remaining. In this event (decision 65 being YES), process 68 will be performed by switch 20 to apply backpressure to port 2, which corresponds to the receive side of port 2 asserting an active level on its output FLOW. In response, the source of the packets to port 2 will respond to the backpressure in a manner corresponding to the nature of those communications.

Figure 6C:
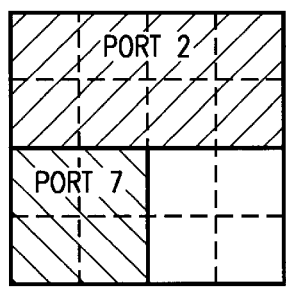

In FIG. 6*c*, a second port, namely port 7, is now also buffering packets within local packet switching memory 45. In this example, port 2 continues to occupy eight buffers, and port 7 now occupies four buffers. As noted above, backpressure is already being applied from port 2, and will continue to be applied considering that the eight buffers occupied by port 2 packets is greater than the four buffers remaining available. In addition, backpressure will also be applied to port 7, as the four buffers occupied by its packets has reached the number (four) of available buffers. This backpressure on ports 2 and 7 will thus permit buffered packets to be processed, clearing buffer space, as shown in FIG. 6*d*.

Figure 6D:
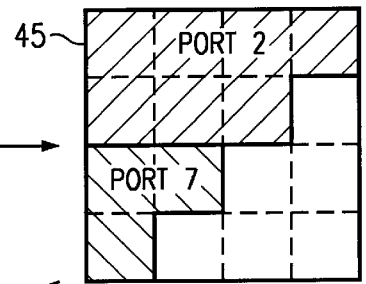
Figure 6E:
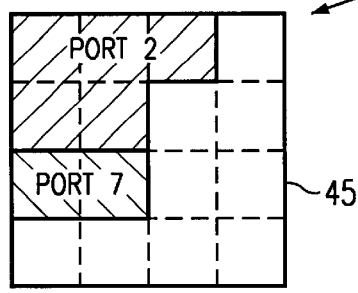

In the state shown in FIG. 6*d*, packets from port 2 occupy seven buffers, and packets from port 7 occupy three buffers, with six buffers remaining available. As such, because the number of buffers occupied by port 7 packets is less than the available buffers, backpressure may be removed from port 7, as its buffer memory usage is below the current HOLB threshold. However, the buffers occupied by port 2 packets still exceeds the number of available buffers, and as such the port 2 buffering continues to exceed the HOLB threshold; accordingly, backpressure remains applied to port 2. It should be noted that the HOLB threshold is now lower than in the case of FIGS. 6*a* and 6*b*, because of the presence of buffered packets for a second port (i.e., port 7). Following the continued backpressure applied to port 2, its buffered packets continue to be processed, reducing the buffers occupied thereby to a level below the HOLB threshold (as shown in FIG. 6*e*), at which point backpressure is removed from port 2 as well.

In this way, the dynamic determination of the HOLB threshold, based upon the usage of the packet buffer memory by all of the available ports, provides an efficient yet fair approach to the invocation of backpressure. If the packet buffer memory is not heavily utilized by a number of ports, a particularly high-bandwidth message can be processed efficiently through the use of a relatively large buffer; conversely, if many ports are buffering their packets, no one port is able to unfairly dominate the packet buffer memory, nor is any one port unfairly deprived of such buffering. It is therefore contemplated that switches 20, 30 according to the preferred embodiment of the invention will be able to provide important benefits to the overall network performance, as a result of this dynamically varying threshold.

Furthermore, the head-of-line blocking treatment performed by switches 20, 30 according to the preferred embodiments of the invention provide additional advantages in the overall operation of a larger-scale implementation, such as switch system 10 and alternatives thereto. One such advantage is due to switches 20, 30 themselves handling the flow control in a fair and efficient manner, so that downstream switching fabric need not deal with flow control issues; this permits the use of switch fabrics of simpler architecture that are optimized for packet switching, reducing the cost of large-scale switching systems, and also improving network performance by offloading the flow control function from the critical path of the switching fabric.

The head-of-line blocking techniques described hereinabove according to the preferred embodiments of the invention may also be used in combination with other flow control approaches. For example, the conventional flow threshold value may be used in addition to the HOLB threshold value, such that flow control is applied to a port whenever either the HOLB threshold or the flow threshold is exceeded. This and other alternatives are contemplated to be apparent to those of ordinary skill in the art having reference to this specification.

Referring back to FIG. 3, switch system 10 according to the first embodiment of the present invention is arranged as a ring of switches 20 and switch 30, as noted above. According to the preferred embodiments of the invention, switches 20, 30 are able to apply pretagging to frames on receipt or on transmission, prior to their retransmission to destination ports. This pretagging enables the ring arrangement of switch system 10, as well as alternative high-density and high-performance switch systems according to the present invention. As will become apparent to those skilled in the art having reference to the following description, the pretagging which may be applied by switch 20 to its communicated packets can be of two different types. For the ring arrangement of FIG. 3, according to this first embodiment of the invention, the packet pretags refer to the ring architecture and to the residents upon this ring. Other arrangements utilize an extended port awareness pretag, as will be described hereinbelow relative to another preferred embodiment of the present invention.

Considering the first type of pretag for use in the ring configuration of switch system 10 shown in FIG. 3, each of switches 20, and also switch 30, must be configured to generate and respond to the appropriate pretag information, as well as comprehend its own location within the ring architecture. This configuration information, including a "Ring ID" value associated with the particular switch 20, is preferably stored in an internal register of switch 20, 30; preferably, the configuration information is stored within an external EEPROM that, upon reset, is read by switch 20, 30 via EEPROM interface 56 in order to set the proper configuration information within the internal registers of switch 20, 30. Alternatively, CPU 29 can also provide this configuration information via digital interface DIO. As such, the following description presumes the appropriate configuration of switch 20, including assignment of a Ring ID value therefor.

Figure 7:
FIG. 7 is a timing diagram illustrating the presentation of an out-of-band Ring ID pretag in an Ethernet message packet.
Figure 7:
Figure 7:
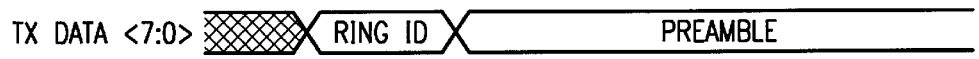

For the ring arrangement of FIG. 3 according to this first embodiment of the invention, the Ring ID pretag is an "out-of-band" pretag, in that the pretag is present in the packet prior to the assertion of a transmit enable signal; accordingly, the already-present preamble information within the packet is not disturbed. FIG. 7 is a timing diagram illustrating the relative location of the Ring ID pretag signal according to the first embodiment of the invention. As is conventional, a clock signal is presented by a transmitting ring port, namely gigabit port 8 of switch 20, on control line PORT CLK, which is one of the control lines exiting therefrom; of course, the receiving switch 20, 30 will receive this clock signal on the receive side of its gigabit port 8, for synchronous receipt of the data signals transmitted on lines TX DATA (and received on lines RX DATA). Also as shown in FIG. 7, a control signal is issued by transmitting switch 20 on control line PORT EN, and indicates (with an active high level) the time at which valid packet information is presented by transmitting switch 20 on lines TX DATA <7:0> from its gigabit port 8; these signals are received on the corresponding receive data lines RX DATA <7:0> of the receive side of the gigabit port 8 of the next switch 20 (or 30) in the ring arrangement (e.g., as shown in FIG. 3). As shown in FIG. 7, the Ring ID pretag is transmitted by switch 20 on lines TX DATA <7:0> during the period of PORT CLK in advance of the rising active edge of control signal PORT EN. As such, the Ring ID pretag is referred to as an out-of-band pretag, in that its data is presented in advance of the valid packet data (beginning with the active level of control signal PORT EN). According to the preferred embodiment of the invention, however, the receive sides of the gigabit ports (ports 8) of each of switches 20, 30 that are connected in the ring arrangement are configured in such a manner as to retain the Ring ID pretag information received on its lines RX DATA <7:0> in this preceding clock period.

The actual Ring ID pretag data is preferably presented on lines TX DATA <7:0> in a redundant manner. In the preferred embodiments of the present invention, referring to FIGS. 4a and 4b, it is contemplated that MAC 46 associated with port 8 of switch 20 (and with ports 0 and 1 of switch 30), will be the circuitry that generates the pretag for the packets transmitted therefrom. In particular, it is preferred that the four lines TX DATA <3:0> fully present a Ring ID value (i.e., one of sixteen), and that the four lines TX DATA <7:4> mirror that identical value. This redundancy provides the receiving switch 20, 30 with some amount of error detection, and possibly a technique for detecting the Ring ID pretag itself.

The Ring ID values are assigned uniquely to each switch 20, 30 in the particular ring arrangement of switch system 10. The particular Ring ID value assigned to each switch 20, 30 is not critical, nor is the order of such assignment, except that the Ring ID value of zero is preferably reserved for use by an optional management CPU. As will be noted below, a single switch 30 may reside on two separate rings in some arrangements, and will thus have a Ring ID for each of the two rings; in this case, proper operation requires that these two Ring ID values for this switch 30 differ from one another.

Referring back to FIG. 3, in combination with FIGS. 8a through 8c, the operation of switch system 10 according to the first preferred embodiment of the present invention, implemented by way of switches 20 and switch 30 arranged in the ring shown in FIG. 3, and utilizing the pretag feature described hereinabove, will now be described in detail. As noted above, each of switches 20, 30 are configured to operate in a ring configuration, such as switch system 10, by setting appropriate values in their respective control registers upon reset or power-up, such values also including the Ring ID associated with each switch 20, 30. For switches 20, 30 constructed as described above relative to FIGS. 4a and 4b, respectively, such configuration may be effected by way of management CPU 29 loading memory-mapped configuration registers within local packet switching memory 45 over digital interface DIO, or alternatively by switch 20, 30 reading an external EEPROM containing the configuration data over its EEPROM interface 54.

According to this first preferred embodiment of the invention, switches 20, 30 each "learn" the addresses of each of the ports within switch system 10 over which communications are carried out. This learning process must take place, for a given port, prior to the successful routing of any packets thereto. Accordingly, this learning process will first be described for switch system 10 with reference to FIG. 8a, in combination with FIG. 3, by way of an example of its operation.

Figure 8A:
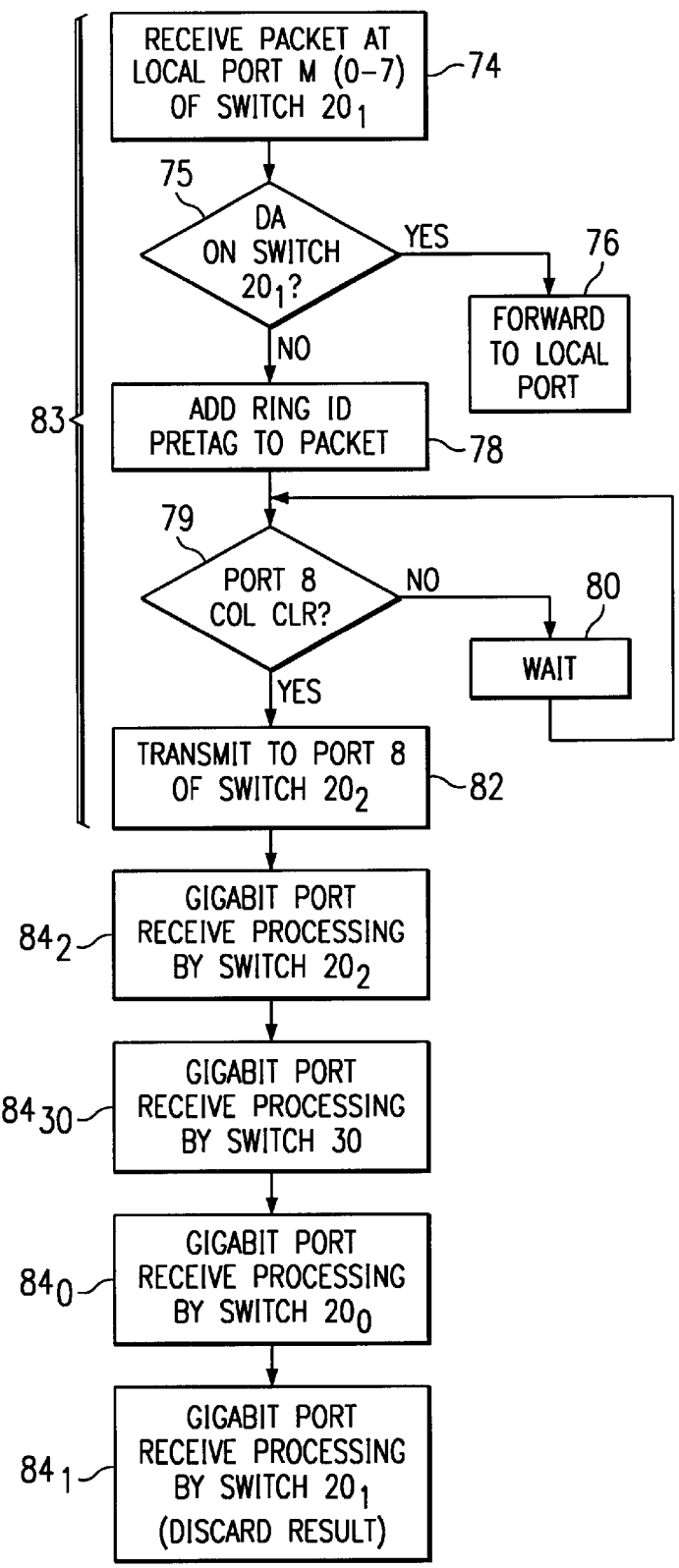
FIGS. 8a through 8c are flow diagrams illustrating the operation of the switch system of FIG. 1 according to the first preferred embodiment of the invention.

In the example of FIG. 8a, a message packet is received in process 74 at one of the local ports (ports 0 through 7) of switch 20₁, in switch system 10 arranged in ring fashion, as shown in FIG. 3. Switch 20₁, next executes decision 75 by way of its address lookup engine 48, to determine if the destination address (DA) of this packet is registered with one of its local ports (ports 0 to 7). If so (decision 75 is YES), the packet would be forwarded to the local port associated with this destination address by address lookup engine 48. If the destination address is registered with gigabit port 8, as corresponding to a destination elsewhere on the ring of switch system 10, or if the destination address is not registered with address lookup engine 48, decision 75 is NO and control passes to process 78 to prepare the packet for transmission over gigabit port 8. In this example, as noted above, none of switches 20, 30 in switch system 10 have yet registered the destination address of this particular packet. As such, decision 75 is NO for this packet.

Switch $20_1$ next prepares the packet for transmission over the ring arrangement of switch system 10, by adding its Ring ID value as a pretag to this received packet in process 78. The packet is then ready for transmission over gigabit port 8 of switch $20_1$. For purposes of effecting flow control, switch $20_1$ first determines if control line COL at the transmit side of its gigabit port 8 is clear, in decision 79. If not clear, which means that the next downstream switch $20_2$ is applying backpressure by asserting its line FLOW, switch $20_1$ iterates the loop of wait state 80 and decision 79 until control line COL is clear (decision 79 is YES), in response to which switch $20_1$ transmits the packet, with the Ring ID pretag, to the gigabit port 8 of switch 202 in process 82.

The processing described hereinabove that is applied to the receipt of a packet from a local port, such as one of ports 0 through 7 of switch 201, is similarly performed for received packets even after the registration and learning process described herein. In this regard, processes 74, 76, 78, 82, along with decisions 75, 79 and wait state 80, are collectively referred to herein as local port receive process 83, as such processes are applied by switches 20 (and, with minor variation, by switch 30) to each packet received at one of the local ports.

The receipt of a packet at a gigabit port, namely port 8, of a switch 20, 30 according to this preferred embodiment of the invention causes that receiving switch to perform gigabit port receive process 84. In this example, as shown in FIG. 8a, following the transmission of the packet from switch $20_1$ in process 82, switch $20_2$ performs its gigabit port receive process in process $84_2$. The operations performed by switch $20_2$ in process $84_2$, will follow a generalized process 84 as performed by each of switches 20, 30 upon receipt of a packet from the ring over their gigabit port, as will now be described relative to FIG. 8b. This description will refer to the operation of one of switches 20, it being understood that the operation of switch 30 will proceed in similar fashion.

Figure 8B:
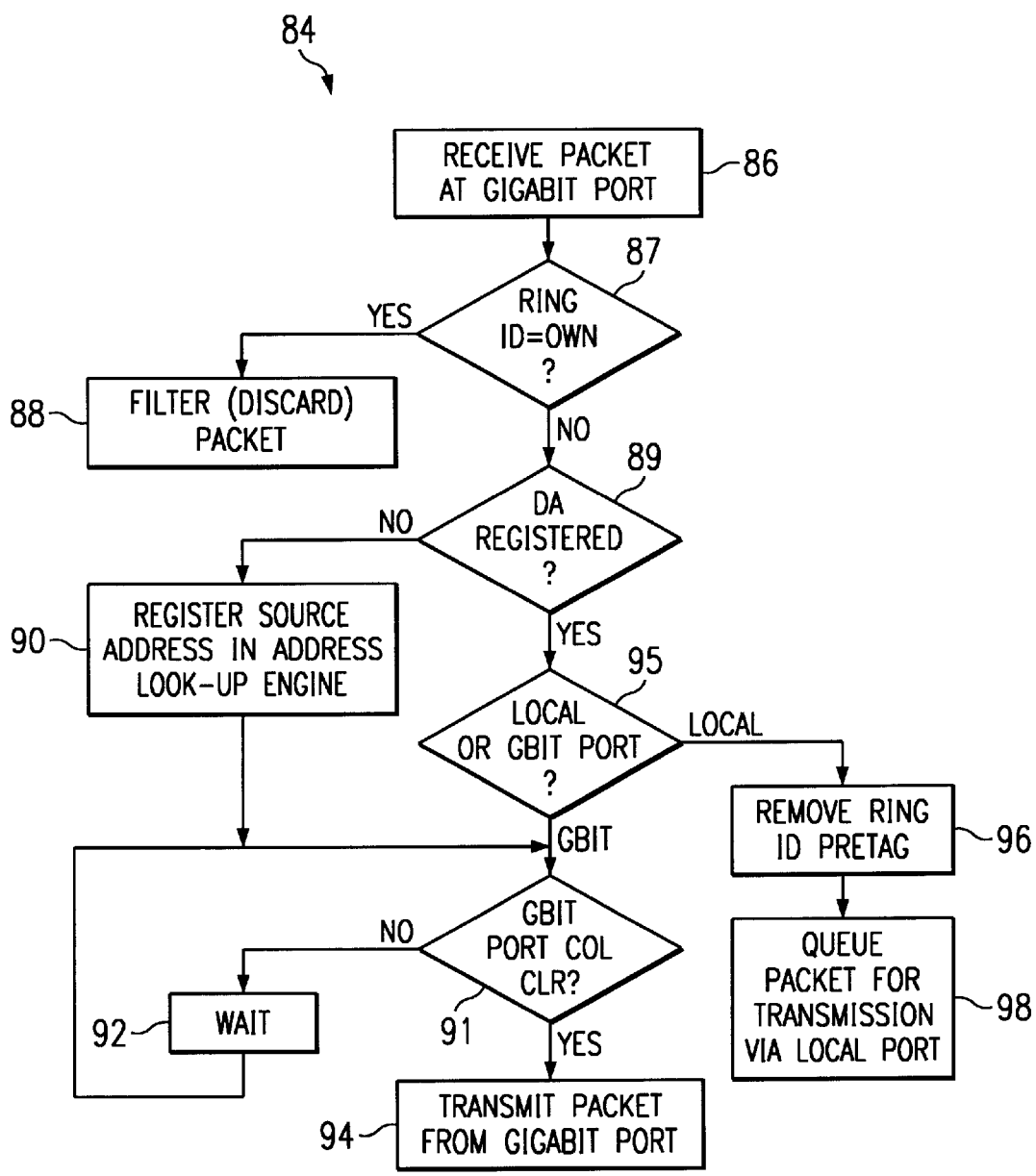

In the general case, as shown in FIG. 8b, process 84 is initiated with switch 20 receiving a packet from the ring at its gigabit port, port 8, in process 86. As noted above, this packet will include a Ring ID pretag, presented in the manner shown in FIG. 7. Switch 20 then performs decision 87 to determine whether the Ring ID value in the received packet corresponds to that of switch 20 itself. If so (decision 87 is YES), the received packet was originally issued to the ring by switch 20 itself, and has traveled the entire ring without being forwarded to any destination port; as such, according to the preferred embodiments of the invention, switch 20 will filter, or discard, the packet in process 88. This prevents a packet from repeatedly circling the ring, unnecessarily occupying bandwidth.

If the Ring ID does not correspond to that of receiving switch 20 itself (decision 87 is NO), switch 20 next performs decision 89 to determine if the destination address (DA) specified in the packet has been registered in the address lookup engine 48 of switch 20 as corresponding to one of the local ports or the gigabit port of switch 20 as the destination of the packet. If so (decision 89 is YES), address lookup engine 48 of switch 20 next performs decision 95 to determine the port of switch 20 to which the destination address corresponds, and to which the received packet is to be forwarded. If the destination address is registered to one of local ports 0 through 7 (decision 95 is LOCAL), switch 20 strips the Ring ID pretag from the packet, in process 96, and queues the packet for transmission over the appropriate local port in process 98. Transmission of the packet will then be carried out over the local port, in the conventional manner. If the destination address is registered to the gigabit port 8 of switch 20 (decision 95 is GBIT), switch 20 then retransmits the packet over the ring by way of port 8. This transmission is effected by switch 20 first waiting for control line COL of its gigabit port 89 to be clear, via decision 91 and wait state 92 in the manner described hereinabove. Upon control line COL being clear (decision 91 is YES), switch 20 transmits the packet onto the ring via its gigabit port, with the same Ring ID pretag as received in process 86 (as this Ring ID value indicates the switch 20 that originally placed the packet onto the ring).

Referring back to the example of FIG. 8a, the first instance of gigabit port receive process $84_2$ is performed by switch $20_2$ in response to receiving a packet over the ring at its gigabit port 8 from switch $20_1$, in the example where the destination address of the packet is not known and in which the Ring ID value of the received packet corresponds to the Ring ID value of switch $20_1$. In this example, referring again to FIG. 8b, switch $20_2$ will determine that the Ring ID is not that of itself (decision 87 is NO), and that the destination address of the received packet is not registered in address lookup engine 48 of switch $20_2$ (decision 89 is also NO). Switch $20_2$ will now perform a learning operation, as will now be described with continued reference to FIG. 8b.

Upon decision 89 returning a NO value, process 84 in switch 20 (in the general case; process $84_2$ performed by switch $20_2$ in the specific example of FIG. 8a), continues with process 90, in which switch 20 registers the source address of the received packet in address lookup engine 48. Specifically, since the destination address of the packet is unknown, switch 20 uses this opportunity to learn, or register, the source address of the packet as being a port that resides on a switch 20, 30 on the ring other than itself; as a result, switch 20 registers the source address of this packet with its gigabit port 8, such that switch 20 will then forward any subsequent packets having a destination address equal to the source address of the current packet, to its gigabit port 8. Following completion of process 90, switch 20 transmits the packet (maintaining the Ring ID value) over its gigabit port 8, once control line COL is clear (decision 91 and wait state 92), in process 94.

Returning to the example of FIG. 8a, process $84_2$ is thus performed by switch $20_2$, with the result that the packet is applied back onto the ring by switch $20_2$, after the registration of the source address of the packet (which will be the local port of switch $20_1$ that received the packet in process 74) with its gigabit port 8. As shown in FIG. 3, switch 30 next receives this packet with one of its two gigabit ports, namely port 1 thereof. Process $84_{30}$ is then performed by switch 30; process $84_{30}$ corresponds to process 84 shown in FIG. 8b, with the slight exception that the local port to which reference is made in decision 95 corresponds to gigabit port 0, and thus to uplink UL. In the example of FIG. 8a, the destination address of the packet is not registered, in switch 30, to uplink UL, and as such the result of process $84_{30}$ is the registration of the source address of the packet with gigabit port 1, and retransmission of the packet onto the ring for receipt by switch $20_0$.

In process $84_0$ of the example of FIG. 8a, switch $20_0$ similarly determines that the Ring ID of this packet does not correspond to its own Ring ID (decision 87 is NO), and that the destination address of the packet is not registered in its address lookup engine 48 (decision 89 is also NO). Switch $20_1$ then registers the source address in its address lookup engine 48 in process 90, and transmits the packet, still retaining its Ring ID pretag, by way of decision 91, wait state 92, and process 94.

The transmission resulting from process $84_0$ transmits this packet back to switch $20_1$, such that the packet has completely traveled the entire ring of switch system 10. Switch $20_1$ then performs process $84_1$, as it would for any incoming packet on its gigabit port 8. However, in this example, since switch $20_1$ was the originator of this packet, insofar as the ring is concerned, the received packet will have a Ring ID matching that of switch $20_1$ itself (decision 87 is YES). Switch $20_1$ will then filter this packet in process 88, to prevent its recycling around the ring. However, even though the packet itself is discarded, each of switches 20, 30 now has registered, in their respective address lookup engines, the local port of switch $20_1$ that received the packet. Accordingly, any packet that now has a destination address for that local port on switch $20_1$ will be recognized by all of the switches 20, 30 in switch system 10, and properly directed thereto, regardless of the source. As a result, eventually each of the local ports on each of switches 20 that is carrying traffic will be registered in each switch 20, 30 on the ring, such that communications can then be carried out over the ring, as will now be described relative to FIG. 8c.

Figure 8C:
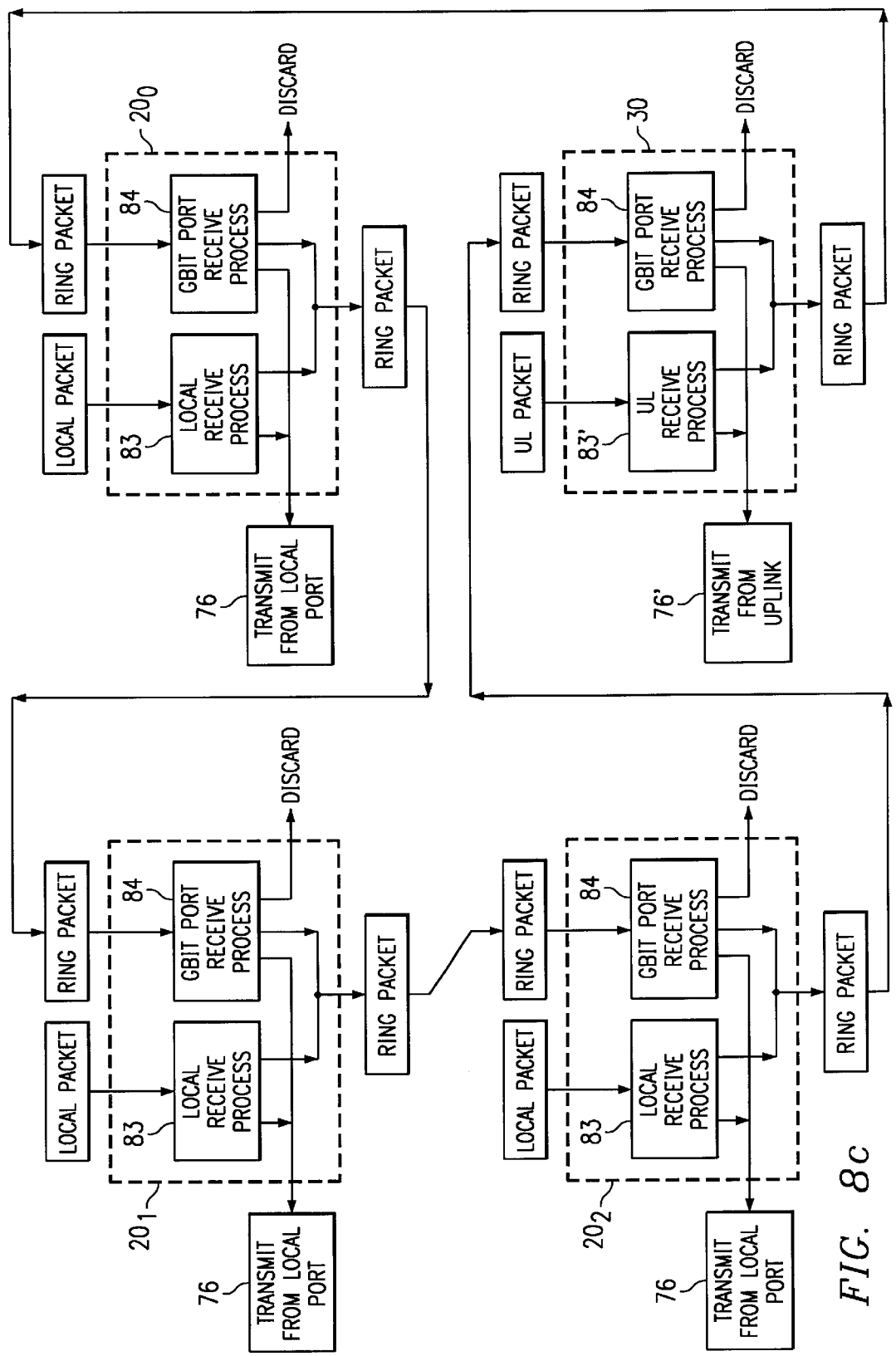

FIG. 8c illustrates, in general, the processing of packets received at either local ports or the gigabit ports of switches 20 of switch system 10, as well as the processing of packets received at either the uplink port or the gigabit ring port of switch 30 therein. As shown in FIG. 8c, beginning by way of example with the processing by switch $20_2$, switch $20_2$ performs local port receive process 83 upon packets received at its local ports, and gigabit port receive process 84 on packets received at its gigabit port from the ring arrangement of switch system 10. Referring to switch 20 in FIG. 8c, and also to the particular steps within process 83 discussed above relative to FIG. 8a, a packet received at a local port of switch $20_2$, if addressed to another local port of switch $20_2$ with a destination address that is registered with the address lookup engine 48 therein, will be transmitted to the destination local port by process 76; local port packets that have a destination address associated with another port on the ring, or for which the destination address is not registered, are forwarded along the ring via the gigabit port, in this case as a ring packet transmitted to switch 30, as shown in FIG. 8c. As described above relative to FIG. 8a, any packet received at a local port of switch $20_2$ and that is forwarded to the ring, is pretagged with the Ring ID pretag prior to transmission.

Additionally, as described above relative to FIGS. 8a and 8b, switch $20_2$ may also receive packets from the ring, at its gigabit port 8. These packets are processed by gigabit port receive process 84 described hereinabove. In short, upon process 84 determining that the Ring ID pretag of the received ring packet matches the Ring ID of switch $20_2$ itself, the packet is discarded as shown in FIG. 8c. If the ring packet is sourced from another switch 20, 30, and has a destination address corresponding to one of the local ports of switch $20_2$ the packet has its Ring ID pretag stripped and is queued for transmission at, and transmitted from, the addressed local port of switch $20_2$. Further, as described above, if the ring packet is not addressed to one of the local ports of switch $20_2$, by virtue of having a destination address associated by address lookup engine 48 with gigabit port 8 of switch $20_2$, or by virtue of having an unrecognized destination address, the packet is transmitted over the ring to the next switch 30 (in this case), maintaining the same Ring ID pretag value thereupon.

As noted above, switch 30 is immediately downstream from switch $20_2$ in the ring example of FIGS. 3 and 8c. In this regard, as noted above, switch 30 is capable of executing gigabit port receive process 84 to determine if the received ring packet is addressed to the local port of switch 30 which, in this example is the uplink gigabit port 0 of switch 30, in which case the received ring packet will be transmitted over the uplink in process 76'. Process 84 also determines whether the received ring packet originated from switch 30 (by having the same Ring ID value as switch 30) in which case the packet is discarded, or whether the received ring packet is directed to another port (or an unknown port) on the ring in which case the received ring packet is forwarded, with its current Ring ID pretag, to the next switch $20_0$ on the ring of switch system 10.

Switch 30 also is capable of receiving packets from its own "local" port which, as shown in FIG. 3, is its port 0 that is connected to uplink UL. In this regard, switch 30 performs uplink receive process 83', which is quite similar to local port receive process 83 described hereinabove. If switch 30 receives a packet that is addressed to a port elsewhere on the ring (as indicated by a registered destination address, or by an unknown destination address), process 83'transmits the packet from the ring gigabit port 1 of switch 30, in similar manner as described above relative to switch 202. It is also possible (while unlikely) that the received packet from the uplink is addressed back to the uplink itself, in which case process 83'queues the packet for transmission over the uplink in process 76'.

As shown in FIG. 8c, switches $20_0$ and $20_1$ are similarly connected in the ring with switches $20_2$, 30. Each of switches $20_0$ and $20_1$ is capable of processing packets received at their local ports, by process 83 described above, for transmission from the local port or from the gigabit port, depending upon the packet destination address. In addition, switches $20_0$ and $20_1$ are also programmed to execute process 84 on packets received at their gigabit ports from the gigabit ports of switches 30, $20_0$, respectively.

According to this first preferred embodiment of the invention, therefore, packets received at one of the local ports of one of switches 20, and having a destination address corresponding to the uplink UL from switch 30 or to one of the other local ports on the receiving switch 20 or any of the other switches 20 in switch system 10, may be readily transmitted over the ring of switch system 10 to the desired port. This management and handling of message packets is handled in an efficient manner, with switches 20 themselves managing the routing of the message packets over high-speed (e.g., gigabit) links that comprise the ring. As a result, and considering that the ring traffic travels in only one direction (precluding the possibility of collisions), the theoretical bandwidth of switch system 10 in this example is 4 Gbit/sec. Furthermore, flow control is automatically effected for ring transmissions, in a manner that fairly and efficiently assigns buffer resources as needed and as available. As a result, switching system 10 according to this first preferred embodiment of the invention thus provides a high density Ethernet switch, in this example a 0/24/1 capacity switch, using a relatively simple and self-managing architecture.

Figure 9:
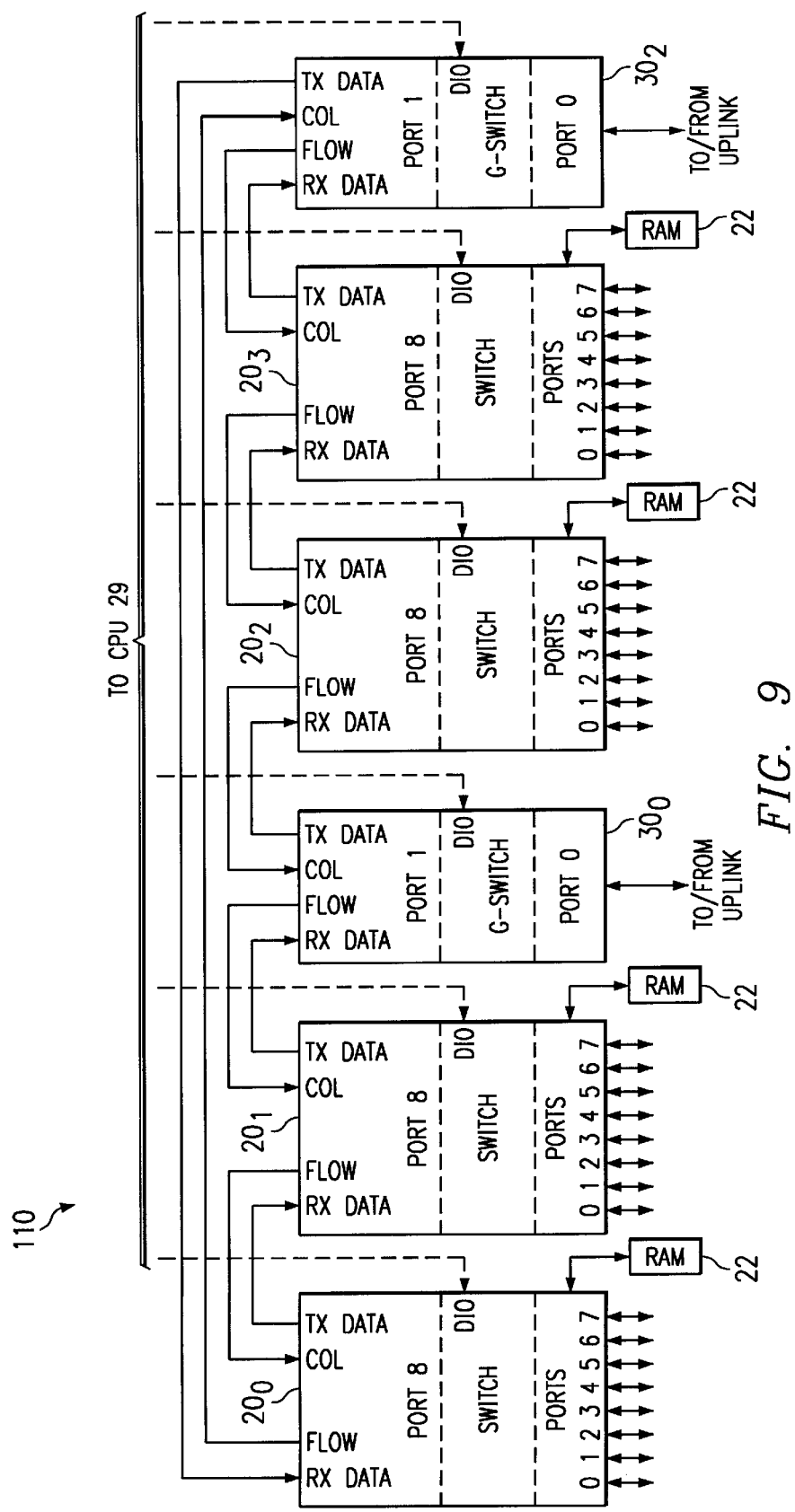
FIG. 9 is an electrical diagram, in block form, of a switch system for the network of FIG. 2 according to a second preferred embodiment of the invention.

Referring now to FIG. 9, switch system 110 according to a second preferred embodiment of the invention will now be described in detail. Switch system 110 may be implemented into an overall Ethernet network in similar fashion as switch system 10 shown in FIG. 2. Switch system 110 provides increased capacity relative to switch system 10, specifically as a 0/32/2 capacity Ethernet switch, by way of a single ring of switches as will now be described.

As shown in FIG. 9, switch system 110 includes four Ethernet switch devices 20, and two gigabit Ethernet switch devices 30, connected in a ring fashion. Switch devices 20 are single integrated circuit switch devices constructed as described hereinabove relative to FIG. 4a, and as such each provides 0/8/1 Ethernet switch capability, while switch devices 30 are single integrated circuit switch devices constructed as described above relative to FIG. 4b, and providing 0/0/2 Ethernet switch capability. As in the case of switch system 10 described above, each switch 20 is connected to, and operates in conjunction with, external Rambus RAM 22. Each of switches 20, 30 may also be connected to an external CPU (such as CPU 29 shown in FIG. 3) if desired, for purposes of management of switch system 110.

As in switch system 10, each switch 20 has eight 100-Mbit/sec local ports, numbered ports 0 to 7, each port connectable by way of physical layer interface devices and magnetic transformers to a corresponding RJ-45 jack for connection to a client workstation or network hub. Each switch 20 also has a gigabit (i.e., 1000-Mbit/sec) full-duplex port. In switch system 110 according to this second preferred embodiment of the invention, the transmit side of port 8 of switch $20_0$ is connected to the receive side of port 8 of switch $20_1$, an d the transmit side of port 8 of switch $20_0$ is connected to receive side of port 1 of gigabit Ethernet switch device $30_0$. The transmit side of gigabit port 1 of gigabit switch device $30_0$ is connected to the receive side of port 8 of switch $20_2$, the transmit side of port 8 of switch $20_2$ is connected to the receive side of port 8 of switch $20_3$, the transmit side of port 8 of switch $20_3$ is in turn connected to the receive side of gigabit port 1 of gigabit switch $30_1$. The transmit side of port 1 of switch $30_1$, is connected to the receive side of port 8 of switch $20_0$, completing the ring.

As described above, each of gigabit Ethernet switch devices 30 supports two 1000-Mbit/sec full-duplex ports, numbered as ports 0 and 1, each of which preferably include integrated physical coding sublayer logic to provide a direct, ten-bit, digital interface to gigabit transceivers. As in the case of switch 30 in switch system 10 described above relative to FIG. 3, gigabit port 0 of each of switches 30 is coupled to a corresponding uplink, such as a fiber optic facility, for example by way of a serializer/deserializer and an optical serial transceiver module.

As described above, it is preferred that switches 20, 30 be placed as physically close to one another as possible, thus avoiding long signal paths. Additionally, small series resistors (e.g., 33 Ω) are preferably placed near the transmitting terminals of the gigabit links, to prevent signal ringing. The particular order in which switch devices 20, 30 are connected into the ring of switch system 110 is not particularly critical. However, it is preferred that, when multiple gigabit switches 30 are included within a single ring, as in the example of FIG. 9, these gigabit switches 30 are not adjacent to one another. In this way, uplink traffic from local ports of switches 20, for transmission via the uplink connected to the downstream switch $30_1$ (for example) of the pair of switches 30 does not necessarily have to pass through gigabit switch $30_0$.

The operation of switches 20, 30 in effecting communications among the thirty-two local 100-Mbit/sec ports coupled to switches 20, and the gigabit uplinks coupled to switches 30, is identical to that described hereinabove relative to switch system 10. Of course, address lookup engines 48 in switches 20, 30 must be of sufficient size to accommodate the addresses of the eight additional 100-Mbit/sec ports, and the additional gigabit uplink, provided in switch system 110 relative to switch system 10 described above.

As evident from switch system 110 of FIG. 9, the present invention provides a great deal of flexibility in the realization of network switches. As evident from a comparison of switch system 10 with switch system 110, additional capacity may be readily provided by the interconnection of additional switch devices 20, 30 as desired. Furthermore, the configuration of each of switches 20, 30 as into the ring system is contemplated to be independent of the number of switches 20, 30 to be so implemented, so long as the Ring ID values associated with each of switches 20, 30 are uniquely assigned. As such, additional switch capacity may be provided simply by the addition of switch devices 20, 30 into a previously configured switch system. This new configuration is established by powering down the original switch system, interconnecting the devices (assuming that physical circuit board resources are available for the same), and powering up the switch system.

According to a third preferred embodiment of the present invention, extension of the switch system into a "ring of rings" is also contemplated. In particular, it is contemplated that each switch system ring, such as switch systems 10, 100 described above, may be implemented within a physical enclosure or upon a single card; according to the third preferred embodiment of the invention, as will be described hereinbelow, it is contemplated that the switch systems may be extended to incorporate multiple cards or enclosures (as the case may be), each containing a ring switch system.

Figure 10:
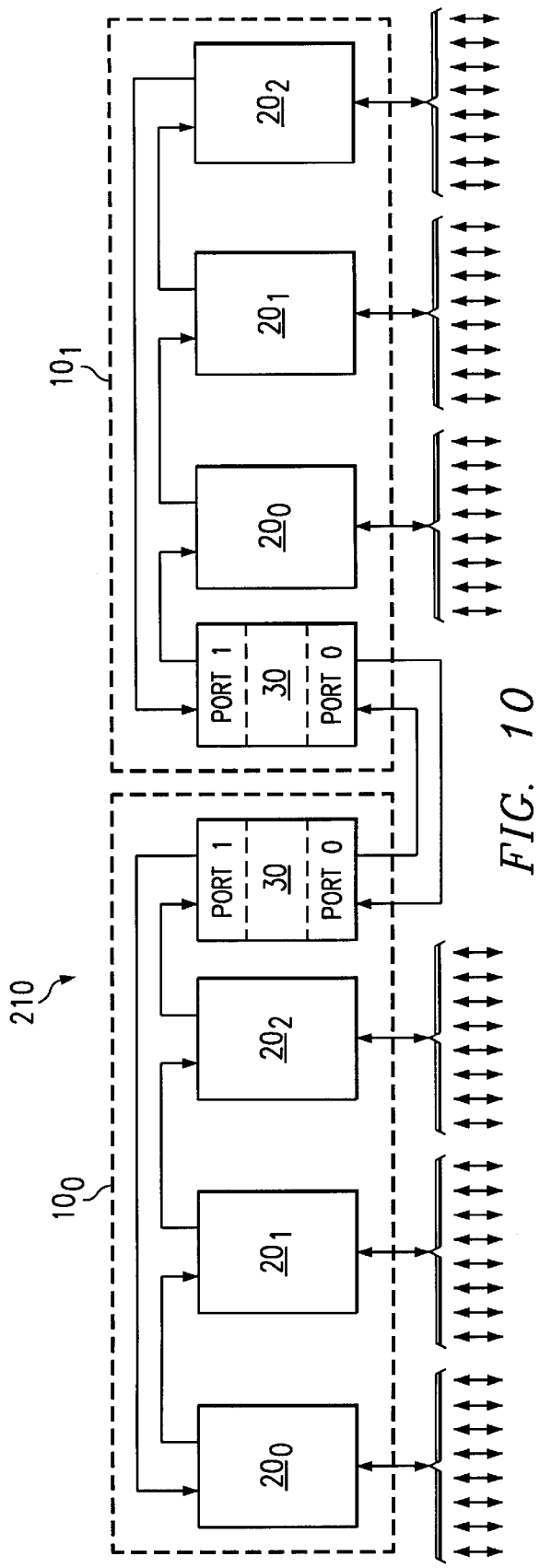
FIG. 10 is an electrical diagram, in block form, of a switch system for the network of FIG. 2 according to a third preferred embodiment of the invention.

FIG. 10 illustrates an exemplary implementation of this third preferred embodiment of the present invention, by way of which a 0/48/0 capacity Ethernet switch system 210 is realized. Switch system 210 may be used in an overall Ethernet network, similarly as described above relative to FIG. 2.

Switch system 210 includes two switch systems 10, constructed in the manner described hereinabove relative to FIG. 3. In this example, each of switch systems $10_0$, $10_1$ include three 0/8/1 capacity switch devices 20, and one 0/0/2 capacity switch device 30, connected in ring fashion as described above. CPU management support, as well as other functionality described above (but not shown in FIG. 10) may be provided as desired. It is contemplated that switch system 210 may be physically realized by two circuit boards, one for each of switch systems $10_0$, $10_1$, either mounted within a single physical enclosure or within its own enclosure. Of course, if practicable, switch system 210 may be realized on a single circuit board, if desired; however, the interconnection between switch systems 10 in this embodiment of the invention is contemplated to be particularly beneficial in the extension of an existing switch system 10 into a higher-capacity arrangement.

It is of course contemplated that the particular construction of switch systems 10 that make up switch system 210 need not be exactly as shown in FIG. 10. Indeed, it is contemplated that either or both of switch systems 10 may include additional gigabit switches 30, for example as constructed in switch system 110 described hereinabove relative to FIG. 9, in the event that a gigabit uplink is desired. As such, the arrangement of FIG. 10 is provided by way of example only.

Interconnection between switch systems $10_0$, $10_1$ is made, in this embodiment of the invention, by way of gigabit ports of gigabit switches 30 in each of switch systems 10. In this example, in each of switch systems $10_0$ and $10_1$, gigabit port 1 of gigabit switch 30 has its receive side coupled to the transmit side of the gigabit port of switch $20_2$, and its transmit side coupled to the receive side of gigabit port of switch $20_0$, as described above. As such, each of switch systems $10_0$, $10_1$ comprise a complete ring arrangement, in the manner described above. Another ring is present between ports 0 of gigabit switches 30 of each of switch systems $10_0$, $10_1$. In this example, the transmit side of gigabit port 0 of gigabit switch 30 of switch system $10_0$ is connected to the receive side of gigabit port 0 of gigabit switch 30 of switch system $10_1$, and the transmit side of gigabit port 0 of gigabit switch 30 of switch system $10_1$ is connected to the receive side of gigabit port 0 of gigabit switch 30 of switch system $10_0$.

In operation, each of switch systems $10_0$, $10_1$ carry out their ring switching among the local ports of switches 20 therein as described above. In this regard, switches 20, 30 in switch system $10_0$ may have destination addresses registered therein that correspond to ports of switch system $10_1$; these destination addresses will be mapped to port 0 of gigabit switch 30 therein, similarly as an uplink destination address described above relative to FIG. 3.

Similarly, the bidirectional connection between switches 30 of switch systems $10_0$, $10_1$ itself operates as a "ring". In this regard, each of ports 0 of switches 30 must themselves have a Ring ID value that is added as a pretag. The Ring ID value of port 0 of each of switches 30 must be different from the Ring ID value of its port 1 (and, of course, unique relative to each other). The establishment of a "ring" between switches 30 of switch systems $10_0$, $10_1$ permits the learning operation described above relative to a new local port to be carried out over both switch systems $10_0$, $10_1$, as will now be described.

In switch system 210, learning of a new local port is to occur over both of switch systems $10_0$, $10_1$ for any local port. This is carried out by way of a dual transmission of an unknown destination packet by each of switches 30. Consider the example of a local port on switch system $10_0$ receiving a packet with an unknown destination address. As described above relative to FIG. 8a, this packet, having the Ring ID value of the switch 20 supporting that local port, is transmitted around the ring comprised of switches 20, 30 of switch system $10_0$, until the packet returns to the receiving switch 20, at which point the packet is filtered and discarded. In switch system 210, however, switch 30 of switch system $10_0$ not only forwards a packet of unknown destination address to the receive side of the gigabit port of its switch $20_0$, but also forwards this packet to the corresponding switch 30 in switch system $10_1$. This forwarding by switch 30 is done by stripping the Ring ID pretag from the received packet, adding a new Ring ID pretag to the packet with the Ring ID value of switch 30 of switch system $10_0$ on the "ring" established by it and its counterpart switch 30, and transmitting the new packet. Switch 30 of switch system $10_1$ receives this packet and, upon determining that the destination address is not recognized thereby, also forwards the packet in two directions. In one direction, the packet is forwarded back to switch 30 of switch system $10_0$ (since the Ring ID value did not match that of port 0 of switch 10 of switch system $10_1$); switch 30 of switch system $10_0$ receives this packet, recognizes that its Ring ID value matches its own, and discards the packet. Switch 30 of switch system $10_1$ also strips the Ring ID value from the packet, pretags a new Ring ID value thereto (corresponding to the Ring ID of switch 30 within the ring of switch system $10_1$), and sends the packet around the ring of switch system $10_1$, where each of switches 20 also learn the source address of the packet, and retransmit the packet. Upon the packet returning to switch 30 in switch system $10_1$, where the Ring ID value matches that of switch 30, the packet is discarded. As a result, each of switches 20, 30 has now learned and registered the source address of the local port that received the packet, such that new transmissions directed to that port will be properly directed.

As noted above, this embodiment of the invention provides the additional advantages that the ring arrangement of switches can be readily extended beyond the capability of a single circuit board or enclosure, encompassing additional rings into a "ring of rings". In this regard, it will be recognized by those skilled in the art that a third ring may be inserted into the ring of gigabit switches 30, considering that switches 30 are already operating as a "ring" between themselves already. Great flexibility is thus provided according to this embodiment of the invention, such that high capacity network switches may be readily constructed.

Figure 11:
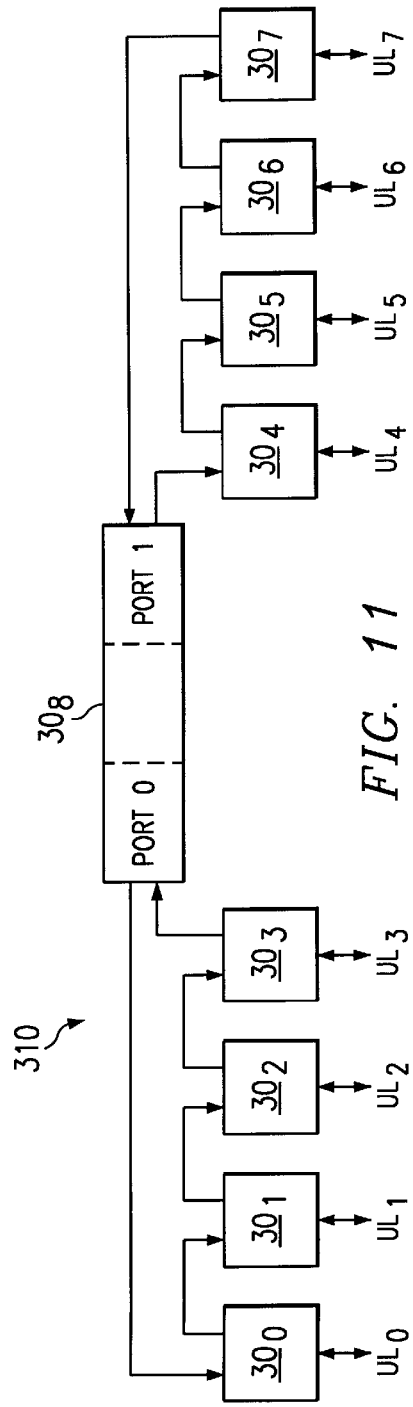
FIG. 11 is an electrical diagram, in block form, of a switch system in the network of FIG. 2 according to a fourth preferred embodiment of the invention.

According to a fourth embodiment of the present invention, a complex ring of gigabit switches may also be constructed, as will now be described relative to FIG. 11. As in the previous embodiments of the invention, switch system 310 according to this fourth embodiment of the invention may serve in the place of switch system 10 of FIG. 2, thus providing network switching for a large number of client workstations, either directly or via network hubs. In the exemplary implementation of FIG. 11, as will now be described, switch system 310 provides 0/0/8 switching capacity, with eight gigabit uplinks $UL_0$ through $UL_7$.

Switch system 310 according to this embodiment of the invention includes two rings of gigabit switches 30, with switches $30_0$ through $30_3$ and port 0 of switch $30_8$ forming one ring, and switches $30_4$ through $30_7$ and port 1 of switch $30_8$ forming the other ring. As evident from FIG. 11, switch $30_8$ resides on both rings; as noted above, the Ring ID value for port 0 of switch $30_8$ must be different from the Ring ID value for port 1 of switch $30_8$. Switches $30_0$ through $30_3$ and port 0 of switch $30_8$ will each have unique Ring ID values relative to one another, with switches $30_4$ through $30_7$ and port 1 of switch $30_8$ having unique Ring ID values relative to one another, although one or more switch 30 that wholly reside on one ring may have the same Ring ID as a switch 30 wholly residing on the other ring.

The operation of switches 30 in switch system 310 to learn and route message packets follows substantially the description provided hereinabove, in that packets arriving at one of uplinks UL may be routed to another one of uplinks UL, either on the same ring or on the other ring, by each switch 30 interrogating a Ring ID pretag that the receiving switch 30 attaches to the packet, and forwarding the packet along the ring if the destination address does not match its own uplink UL, as determined by address lookup engine 48 therewithin. The operation of switch $30_8$ in communicating packets between rings, and also in forwarding unknown destination packets to both rings, follows that described hereinabove for switches 30 in switch system 210 of FIG. 10.

This fourth embodiment of the present invention thus illustrates that switch systems having a large number of high-speed (e.g., gigabit) links may be readily constructed and realized, according to a simple architecture. As noted above, the configuration of the switches may be effected on reset, for example by way of a management CPU or by configuration register settings retained in an external EEPROM or the like. High-performance network switching is therefore easily provided.

Figure 12:
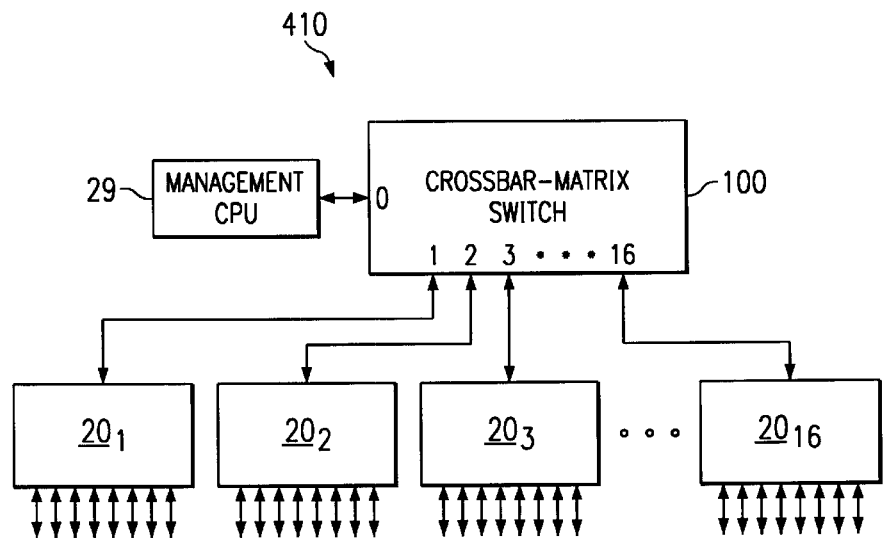
FIG. 12 is an electrical diagram, in block form, of a switch system in the network of FIG. 2 according to a fifth preferred embodiment of the invention.

According to a fifth embodiment of the invention, as will now be described in further detail, another capability of switches 20, 30 described hereinabove is utilized to advantage, in providing a high-density network switch. Attention is now directed to FIG. 12, in which switch system 410 according to this fifth preferred embodiment of the present invention is illustrated. Exemplary switch system 410 according to this embodiment of the invention provides a switch of 0/128/0 capability, as will be apparent from the following description.

Switch system 410 according to this preferred embodiment of the invention includes sixteen switches $20_1$ through $20_{16}$, each of switches 20 preferably constructed as described above relative to FIG. 4a to have eight 100-Mbit/sec local ports (ports 0 through 7) and a gigabit port (port 8). The gigabit port 8 of each switch 20 is connected, in full-duplex fashion, to a corresponding port of crossbar-matrix switch 100. The full-duplex connection of ports 8 of switches 20 to switch 100 includes dedicated transmit and receive sides, as discussed above, with corresponding control signals such as COL and FLOW, enables, and clock signals. Management CPU 29, which optionally may be connected to the digital input/output ports DIO of each of switches 20 (such connection not shown in FIG. 12) is bidirectionally connected to port 0 of crossbar-matrix switch 100, which is reserved for management communications. Via port 0 of crossbar-matrix switch 100, management CPU 29 can configure the operation of switch system 410 to implement such network communications functions as BPDU forwarding for the spanning tree algorithm, SNMP packets for network management, and IGMP frames for IP multicast.

The operation of switch system 410 utilizes an extended port awareness functionality provided by switches 20, constructed according to the preferred embodiments of the invention as described above relative to FIG. 4a. This extended port awareness refers to the associated storage, in address lookup engine 48 of each switch 20, of a downstream destination for certain destination addresses of message packets received from a local port. In this embodiment of the invention, the downstream destination is one of one of the ports of crossbar-matrix switch 100. Upon receipt of a message packet having a destination address registered to one of the crossbar-matrix switch 100 ports, the receiving switch 20 (e.g., MAC 46 associated with port 8) will produce an in-band pretag that is applied to the packet when forwarded to crossbar-matrix switch 100 from gigabit port 8 of switch 20, where the pretag includes the port (or ports, in a multicast mode) of crossbar-matrix switch 100 to which the packet is to be switched by crossbar-matrix switch 100.

The enabling of this extended port awareness function in switches 20, as well as the configuration of switches 20 to operate in combination with crossbar-matrix switch 100 in crossbar switch system 410 such as shown in FIG. 12, is effected upon reset or power-up by the loading of configuration information into control registers within switches 20. As described above, local packet switching memory 45 in switches 20 (FIG. 4a) include memory-mapped registers therein, which may be loaded with configuration information from management CPU 29 via port DIO and interface 56, or from an external EEPROM via interface 54. This configuration operation will thus enable switches 20 to function as desired in switch system 410, according to this description.

Figure 13A:
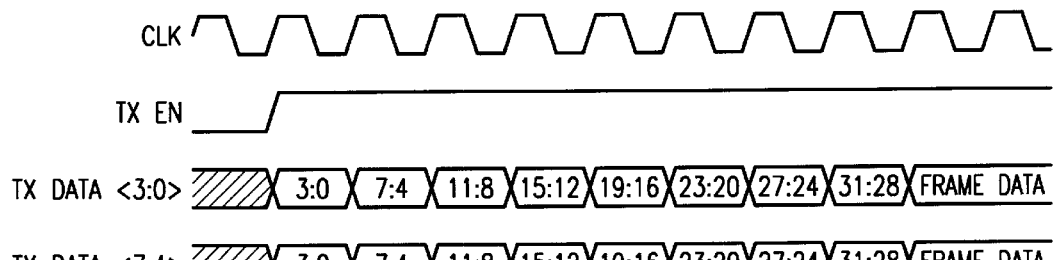
FIGS. 13a and 13b are timing diagrams illustrating the pretagging of packets for extended port awareness as utilized in the switch system of FIG. 12 according to this fifth preferred embodiment of the invention.

Referring now to FIG. 13a, an example of the in-band pretagging generated by one of switches 20 according to the preferred embodiment of the invention, and as used in connection with switch system 410 according to this fifth preferred embodiment of the invention, will now be described. FIG. 13a illustrates the signals transmitted from port 8 of one of switches 20 in forwarding a packet to crossbar-matrix switch 100, in response to receiving a packet at one of its local ports, where the packet has a destination address registered (in address lookup engine 48) to one of the other ports of crossbar-matrix switch 100 (i.e., other than the port to which receiving switch 20 is connected).

According to this preferred embodiment of the invention, the in-band pretag applied by switch 20 is a thirty-two bit pretag, applied in mirrored or redundant fashion upon data lines TX DATA <3:0> and TX DATA <7:4>. The thirty-two bit pretag, as shown in FIG. 13a, is applied four bits at a time (in the above-noted mirrored fashion), in each of the first eight cycles of transmit clock CLK after control line TX EN is driven to an active high logic level. Switch 20 applies the in-band pretag to the frame in the same location (i.e., first eight clock cycles) as the preamble and start-of-frame (SOF) delimiters are provided. As such, upon receipt of a packet from one of its local ports, where the packet is addressed to a location registered to one of the other ports of crossbar-matrix switch 100, receiving switch 20 strips the preamble and SOF delimiter from the frame, and inserts the in-band pretag thereinto, as shown in FIG. 13a.

The thirty-two bit transmit pretag applied by switches 20 according to this embodiment of the invention are formed as follows:

| Pretag bits | Function |
| --- | --- |
| 31:28 | Unconditionally set to zero. |
| 27 | Indicates whether the receiving MAC 42 added an IEEE 802.1Q header |
| 26:25 | Unconditionally set to zero. |
| 24:20 | Identifies the local port of switch 20 that received the packet. |
| 19:17 | Unconditionally set to zero. |
| 16:0 | Bit map indicating the port or ports of crossbar-matrix switch 100 to which the packet is to be transmitted (1 = receives packet; 0 = does not receive packet) |

As evident from the foregoing description, crossbar-matrix switch 100 is capable of multicasting packets simultaneously to multiple ones of its ports, as indicated by the bit map contained within the in-band pretag applied by receiving switch 20.

Figure 13B:
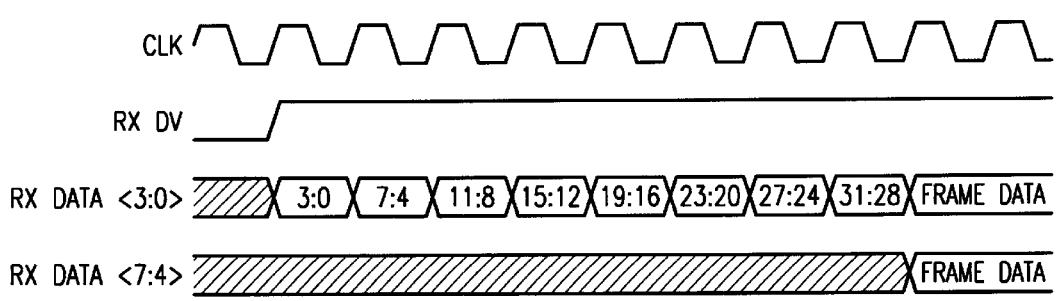

Of course, prior to the in-band pretagging applied by switches 20 in switch system 410 according to the extended port awareness mode, address lookup engine 48 must be trained in order to associate destination addresses. This training is effected by crossbar-matrix switch 100 itself generating a pretag upon a packet that is transmitted to port 8 of one or more switches 20 in switch system 410. Referring now to FIG. 13b, the training of switches 20 according to this embodiment of the invention will now be described relative to an in-band receive pretag generated by crossbar-matrix switch 100, and as received by the receive side of gigabit port 8 of one of switches 20. According to this embodiment of the invention, training is effected by crossbar-matrix switch 100 receiving a packet from another switch 20 connected to one of its ports, stripping any pretag therefrom, and then applying the training in-band pretag to the packet prior to its transmission over one or all of the ports associated with switches 20.

As shown in FIG. 13b, crossbar-matrix switch 100 generates an in-band pretag that is received by switches 20 on its data lines RX DATA <3:0>, in the first eight cycles of link clock CLK following the data valid control line RX DV being driven to an active high level by crossbar-matrix switch 100. The contents of this in-band pretag are as follows:

| Pretag bits | Function |
|---|---|
| 31 | Indicates (with a "1" state) that the packet is a receive learning packet |
| 30:5 | Don't care |
| 4:0 | Encoded value of the port on crossbar-matrix switch 100 that received the frame. |

Upon receipt of the packet with a learning pretag in this form, switch 20 will associate the encoded port number in bits 4:0 of the pretag with the source address of the packet (which is contained within the frame data, following the pretag as shown in FIG. 13*b*). This association will be stored in, and accessible to, address lookup engine 48 in the switch (or switches) 20 receiving the learning pretag and associated packet.

Alternatively, address lookup engines 48 in switches 20 may be trained by management CPU 29 setting the appropriate states therein by way of digital input/output port DIO (not shown).

Figure 14:
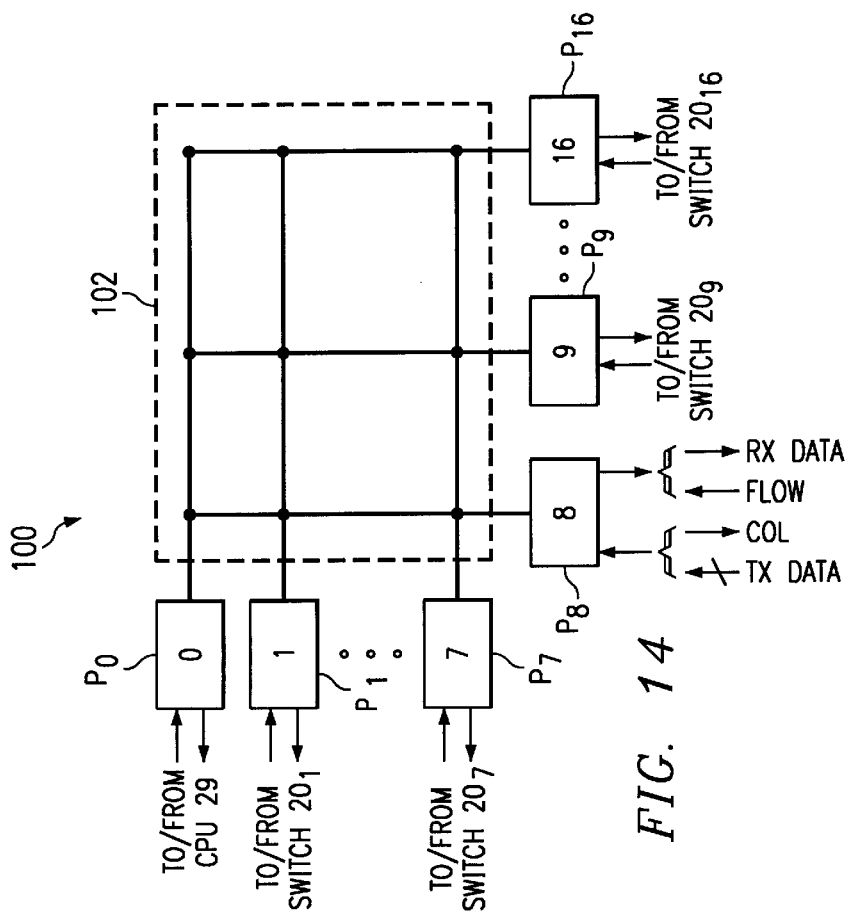
FIG. 14 is an electrical diagram, in block form, of a crossbar-matrix switch as utilized in the switch system of FIG. 12 according to this fifth preferred embodiment of the invention.

Referring now to FIG. 14, the construction of crossbar-matrix switch 100 according to this preferred embodiment of the invention will now be described. As shown in FIG. 14, crossbar-matrix switch 100 includes switching fabric 102, and seventeen ports P. Port $P_0$ is bidirectionally coupled to management CPU 29 as shown in FIG. 12, while ports $P_1$ through $P_{16}$ are bidirectionally coupled to switches $20_1$ through $20_{16}$, respectively. As shown in FIG. 14 for the example of port $P_8$, the bidirectional connection between switch 20 and its port P of crossbar-matrix switch 100 includes lines TX DATA and RX DATA, by way of which crossbar-matrix switch 100 respectively receives data from and transmits data to switch 20. Control signal lines are also included in this bidirectional connection, including line COL driven by port P and line FLOW received by port P, so that flow control may be effected in the manner described hereinabove.

Switching fabric 102 is connected to each of ports P to effect the appropriate packet routing as determined by the pretags of the communicated packets. The particular realization of switching fabric 102 is not critical, nor is the selection of any sort of buffer scheme therewith, as it is contemplated that the particular implementation of switching fabric 102 may be selected by those skilled in the art.

According to this preferred embodiment of the invention, the frame processing requirements upon crossbar-matrix switch 100 are relatively minimal, considering that switches 20 perform the address lookup decisions and pretag processing. As such, in addition to the necessary functionality required for the receipt and transmission of message packets, ports P of crossbar-matrix switch 100 need only perform the necessary pretag manipulation described herein. This processing by ports P relieves switching fabric 102 from processing requirements other than those necessary for routing of packets as instructed by the port addresses, and as such switching fabric 102 may be relatively simple in construction. Considering that the crossbar-matrix switching operation itself can often be in the critical path of network switching, this construction of crossbar-matrix switch 100 therefore can result in improved overall switching performance.

Figure 15:
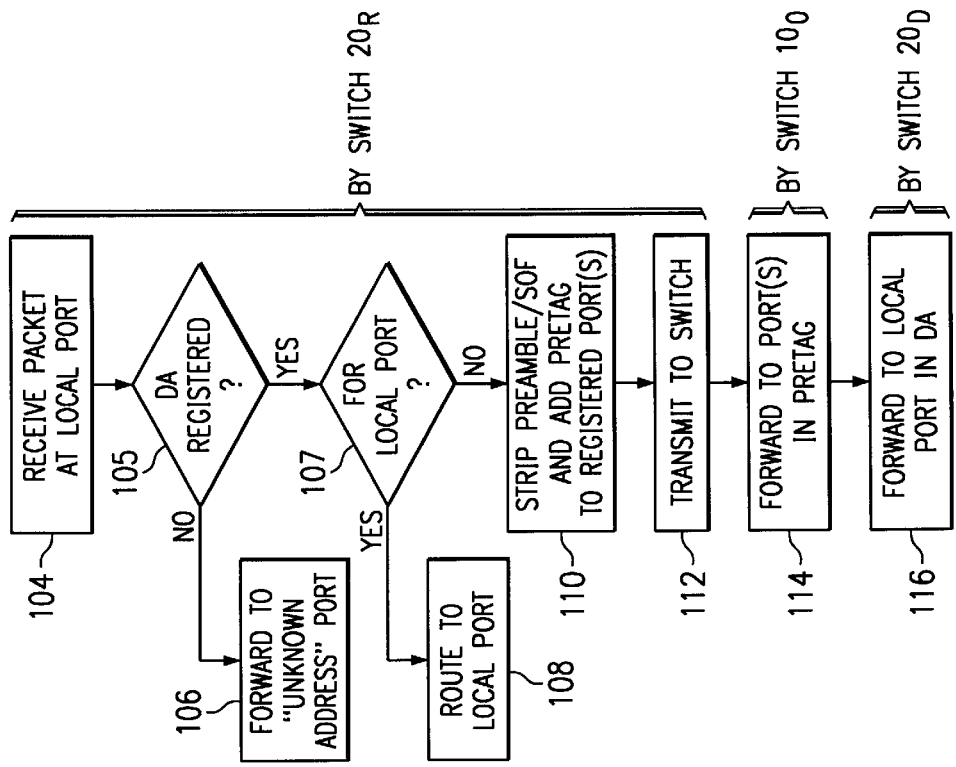
FIG. 15 is a flow diagram illustrating an example of the operation of the switch system of FIG. 12 according to this fifth preferred embodiment of the invention.

Referring now to FIG. 15, the operation of switch system 410 according to this embodiment of the invention will now be described in detail. This description assumes that switches 20 have already been trained to associate destination addresses for packets received at their local ports with ports P of crossbar-matrix switch 100, either by way of management CPU 29 or by way of receive training pretags as described above relative to FIG. 13*b*. In either case, once such training is effected, switches 20 will be able to forward received packets, in the manner that will now be described.

The operation of switch system 410 begins with process 104 in which a network packet is received at one of the local ports (ports 0 through 7) of switch $20_R$. Switch $20_R$ begins processing this packet using its address lookup engine 48 to execute decision 105 to determine if the destination address of the received packet is registered therewith. If not (decision 105 is NO), the packet is forwarded, in process 106, to one of the ports of switch $20_R$ designated (in configuration) as the recipient of packets having unknown addresses. If the destination address is registered with switch $20_R$ (decision 105 is YES), address lookup engine 48 in switch $20_R$ executes decision 107 to determine whether the destination address of the received packet corresponds to one of the local ports (ports 0 through 7) of switch $20_R$. If so (decision 107 is YES), switch $20_R$ forwards the packet to that specified port, and the communication is effected.

If the packet is intended for a destination coupled to one of the local ports of one of the other switches 20 coupled to crossbar-matrix switch 100 (decision 107 is NO), switch $20_R$ next performs process 110 to prepare the packet for transmission thereto. In process 110, switch $20_R$ strips the preamble and start-of-frame delimiter (and such other appropriate overhead) from the packet, and applies the appropriate in-band transmit pretag as described hereinabove relative to FIG. 13*a*, including an indication of the port or ports P of crossbar-matrix switch 100 to which the packet is to be forwarded. The transmission of the packet to crossbar-matrix switch 100 takes place in process 112, in which switch $20_R$ transmits the packet via its gigabit port 8 to the corresponding port P of crossbar-matrix switch 100, over lines TX DATA as noted above. Preferably, flow control capability is provided, such that switch $20_R$ must wait for the control line COL at port 8 to be clear prior to such transmission.

As noted above, the operation of crossbar-matrix switch 100 to perform the appropriate switching is relatively simple, as the processing and address matching has already been performed by switch $20_R$. Accordingly, crossbar-matrix switch 100 performs process 114 simply by forwarding the packet, including pretag if desired, to the desired port or ports P of crossbar-matrix switch 100 indicated by the pretag.

In process 116, the destination switch $20_D$ receives the packet at its gigabit port 8, from crossbar-matrix switch 100. The packet itself includes the destination address (which has already been learned by switch $20_R$ in order for the proper pretag to be applied). As such, address lookup engine 48 in switch $20_R$ need only match up the destination address with the proper one of its own local ports 0 through 7, and forward the packet thereto. The routing of the network packet by switch system 410 is thus complete.

Of course, alternative arrangements of the crossbar-matrix switch system according to this preferred embodiment of the invention may also be implemented, while remaining within the scope of the invention. The present invention provides a great deal of flexibility, and easy implementation, of such alternative arrangements.

Those skilled in the art having reference to this specification will recognize that the present invention provides numerous advantages in the design and operation of network switch systems. These advantages, which have been noted above, include the ability to provide a high-density high-performance network switch, in a manner that may be easily modified for changes in switch capacity. Furthermore, modularity in the arrangement of the switch system, and thus further flexibility in the design and implementation thereof, is provided by the present invention, particularly in permitting easy connection of multiple circuit boards or even switch enclosures into a single switch system. Furthermore, the present invention provides the ability to easily implement flow control techniques, particularly in a manner that prevents a single channel from occupying an unfair portion of the buffer resources of the switch device, while permitting the use of a large portion of these resources if packet buffering is not being used by others of the transmission channels.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of switching message packets in a data communications network by way of a switch system having a first plurality of switch devices coupled into a first switch ring, each of the first plurality of switch devices having a unique ring ID value for the first switch ring, and a second plurality of switch devices coupled into a second switch ring, each of the second plurality of switch devices having a unique ring ID value for the second switch ring;

wherein the first plurality of switch devices includes a first high-speed switch device having a first high-speed port coupled in the first switch ring to high-speed ports of the first plurality of switch devices in the first switch ring, the first high-speed port having a unique ring ID value for the first switch ring, the first high-speed switch device also having a second high-speed port coupled to the second switch ring;

and wherein the method comprises the steps of:
  receiving a message packet at a local port of a first switch device in the first plurality of switch devices, the first switch device associated with a unique ring ID value for the first switch ring, and the message packet having a destination address;
  comparing the destination address of the received packet to a registry of destination addresses associated with ports of the first switch device;
  responsive to the destination address being associated with a high-speed port of the first switch device, attaching a ring ID pretag to the received packet, the ring ID pretag having a value corresponding to the ring ID value of the first switch device, and transmitting the packet and pretag from the high-speed port of the first switch device to a high-speed port of an adjacent switch device in the first switch ring;
  then, for each of at least one subsequent switch device in the first switch ring, performing the steps of:
    receiving the message packet at a high-speed port of the subsequent switch device;
    comparing the ring ID pretag of the received packet to the ring ID value of the subsequent switch device;
    responsive to the ring ID pretag not corresponding to the ring ID value of the subsequent switch device, comparing the destination address of the received packet to a register of destination addresses associated with ports of the subsequent switch device;
    responsive to the destination address of the received packet being associated with a local port of the subsequent switch device, removing the ring ID pretag from the packet, and transmitting the packet from the local port of the subsequent switch device; and
    responsive to the destination address of the received packet not being associated with the high-speed port of the subsequent switch device, transmitting the packet and ring ID pretag from the high-speed port of the subsequent switch device to a next adjacent subsequent switch device in the first switch ring; and
  upon the packet and pretag reaching the first high-speed port of the first high-speed switch, and responsive to the destination address of the received packet being associated with the second high-speed port of the first high-speed switch device, removing the ring ID pretag from the packet, and transmitting the packet from the second high-speed port of the first high-speed switch device.

2. The method of claim 1, further comprising:
wherein the transmit side of the second high-speed port of the first high-speed switch device is coupled to the receive side of a high-speed port of one of the plurality of switch devices of the second switch ring;
wherein the second high-speed port of the first high-speed switch device has a unique ring ID value for the second switch ring;
and further comprising:
  prior to transmitting the packet from the second high-speed port of the first high-speed switch device, attaching a ring ID pretag to the received packet, the ring ID pretag having a value corresponding to the ring ID value of the second high-speed port of the first high-speed switch device.

3. The method of claim 2, further comprising:
after the step of transmitting the packet from the second high-speed port of the first high-speed switch device, for each of at least one subsequent switch device in the second switch ring, performing the steps of:
  receiving the message packet at a high-speed port of the subsequent switch device;
  comparing the ring ID pretag of the received packet to the ring ID value of the subsequent switch device;
  responsive to the ring ID pretag not corresponding to the ring ID value of the subsequent switch device, comparing the destination address of the received packet to a register of destination addresses associated with ports of the subsequent switch device;
  responsive to the destination address of the received packet being associated with a local port of the subsequent switch device, removing the ring ID pretag from the packet, and transmitting the packet from the local port of the subsequent switch device; and
  responsive to the destination address of the received packet not being associated with the high-speed port of the subsequent switch device, transmitting the packet and ring ID pretag from the high-speed port of the subsequent switch device to a next adjacent subsequent switch device in the second switch ring.

4. The method of claim 3, further comprising:

upon the packet and pretag reaching the first high-speed port of the first high-speed switch, and responsive to the destination address of the received packet not being associated with the second high-speed port of the first high-speed switch device, performing the steps of:

registering a source address of the received packet with the first high-speed port of the first high-speed switch device;

transmitting the packet from the first high-speed port of the first high-speed switch device; and then attaching, to the received packet, a ring ID pretag having a value corresponding to the ring ID value of the second high-speed port of the first high-speed switch device; and then transmitting the packet from the second high-speed port of the first high-speed switch device.

* * * * *